(12) United States Patent
Lynch et al.

(10) Patent No.: US 11,251,703 B2
(45) Date of Patent: Feb. 15, 2022

(54) METHODS AND APPARATUS TO FACILITATE MULTIPLE MODES OF CONVERTER OPERATION

(71) Applicant: Texas Instruments Incorporated, Dallas, TX (US)

(72) Inventors: Brian Thomas Lynch, Brookline, NH (US); Stefan Wlodzimierz Wiktor, Raleigh, NC (US); Daniel Curtis Goldner, Manchester, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 41 days.

(21) Appl. No.: 16/712,706

(22) Filed: Dec. 12, 2019

(65) Prior Publication Data

US 2020/0228012 A1 Jul. 16, 2020

Related U.S. Application Data

(60) Provisional application No. 62/791,944, filed on Jan. 14, 2019.

(51) Int. Cl.
*H02M 3/157* (2006.01)
*H02M 3/158* (2006.01)

(52) U.S. Cl.
CPC .......... *H02M 3/157* (2013.01); *H02M 3/158* (2013.01)

(58) Field of Classification Search
CPC ...... H02M 3/157; H02M 3/158; H02M 3/156; H02M 1/08; H02M 2001/0025
See application file for complete search history.

(56) References Cited

U.S. PATENT DOCUMENTS

| 5,585,709 A | 12/1996 | Jansen et al. |
| 6,492,788 B1 | 12/2002 | Agirman et al. |
| 8,693,220 B2 | 4/2014 | Klodowski et al. |

(Continued)

OTHER PUBLICATIONS

Matthew J. Corley and Robert D. Lorenz, "Rotor Position and Velocity Estimation for a Salient-Pole Permanent Magnet Synchronous Machine at Standstill and High Speeds", IEEE Transactions on Industry Applications, vol. 34, No. 4, Jul./Aug. 1998, pp. 784-789.

(Continued)

*Primary Examiner* — Nguyen Tran
(74) *Attorney, Agent, or Firm* — Michael T. Gabrik; Charles A. Brill; Frank D. Cimino

(57) ABSTRACT

Methods, apparatus, systems and articles of manufacture are disclosed that facilitate multiple modes of converter operation. An example apparatus includes a comparator configured to provide a first trigger signal to initiate a first pulse width modulated signal in a constant-on-time mode for a power converter, an oscillator configured to provide a second trigger signal to initiate a second pulse width modulated signal in a fixed frequency mode for the power converter, and a selector configured to receive a select signal, the selector configured to output the first trigger signal to a pulse width modulated signal generator to initiate the first pulse width modulated signal based on a first state of the select signal, and output the second trigger signal to the pulse width modulated signal generator to initiate the second pulse width modulated signal based on a second state of the select signal.

19 Claims, 11 Drawing Sheets

(56) References Cited

U.S. PATENT DOCUMENTS

| | | | |
|---|---|---|---|
| 9,270,220 | B2 | 2/2016 | Magee et al. |
| 9,305,548 | B2 | 4/2016 | Kennewick et al. |
| 9,306,548 | B1 | 4/2016 | Wiktor et al. |
| 9,548,686 | B2 | 1/2017 | Magee |
| 9,825,564 | B2 | 11/2017 | Magee et al. |
| 9,991,777 | B2 | 6/2018 | Lynch et al. |
| 9,998,052 | B2 | 6/2018 | Shimada et al. |
| 2007/0040528 | A1 | 2/2007 | Tomigashi et al. |
| 2011/0221421 | A1* | 9/2011 | Williams .......... H01L 23/49575 324/76.11 |
| 2011/0309781 | A1 | 12/2011 | Tomigashi |
| 2013/0049715 | A1* | 2/2013 | Groom .................. H02M 3/156 323/271 |
| 2014/0225548 | A1 | 8/2014 | Xu et al. |
| 2014/0327379 | A1 | 11/2014 | Yang et al. |
| 2015/0102794 | A1* | 4/2015 | Fan .................... H02M 3/1563 323/283 |
| 2015/0357956 | A1 | 12/2015 | Shimada et al. |
| 2016/0261183 | A1* | 9/2016 | Kelly .................. H02M 3/157 |
| 2017/0006303 | A1 | 1/2017 | Sethuraman et al. |
| 2019/0004577 | A1* | 1/2019 | Laur .................... H02M 3/158 |
| 2019/0204366 | A1* | 7/2019 | Zhou ................... H02M 3/158 |

OTHER PUBLICATIONS

Ji-Hoon Jang, et al., "Analysis of Permanent-Magnet Machine for Sensorless Control Based on High-Frequency Signal Injection", IEEE Transactions on Industrial Applications, vol. 40, No. 6, Nov./Dec. 2004, pp. 1595-1604.

Limei Wang and Robert D. Lorenz, "Rotor Position Estimation for Permanent Magnet Synchronous Motor Using Saliency-Tracking Self-Sensing Method", Industry Applications Conference, 2000, Oct. 8-12, 2000, Rome, Italy, pp. 445-450.

Patrick L. Jansen and Robert D. Lorenz, "Transducerless Position and Velocity Estimation in Induction and Salient AC Machines", IEEE Transactions on Industry Applications, vol. 31, No. 2, Mar./Apr. 1995, pp. 240-246.

Patrick Carner, "Increased Integration, Improved Feature Sets and New Software for Motor Control Systems: C2000 Piccolo F2805x microcontrollers", whitepaper, Texas Instruments, Inc., Nov. 2012, pp. 1-9.

"Clarke & Park Transforms on the TMS320C2xx", Application Report Literature No. BPRA048, Texas Instruments, Inc., 1997, pp. 1-46.

Bianchi, N. et al. "Effect of Stator and Rotor Saturation on Sensorless Rotor Position Detection." IEEE Transactions on Industry Applications, vol. 49, No. 3, May/Jun. 2013, pp. 1333-1342.

Barcaro, M. et al. "Iron Saturation Impact on High Frequency Sensorless Control of Synchronous Permanent Magnets Motor." 978-1-5090-2538-1 @2016 IEEE, pp. 1085-1091.

Li, Y. et al. "Improved Rotor-Position Estimation by Signal Injection in Brushless AC Motors, Accounting for Cross-Coupling Magnetic Saturation." IEEE Transactions on Industry Applications, vol. 45, No. 5, Sep./Oct. 2009, pp. 1843-1850.

Raca, D. et al. "Carrier-Signal Selection for Sensorless Control of PM Synchronous Machines at Zero and Very Low Speeds." IEEE Transactions on Industry Applications, vol. 46, No. 1, Jan./Feb. 2010, pp. 167-178.

Reigosa, D. D. et al. "Measurement and Adaptive Decoupling of Cross-Saturation Effects and Secondary Saliences in Sensorless Controlled IPM Synchronous Machines." IEEE Transactions on Industry Applications, vol. 44, No. 6, Nov./Dec. 2008. pp. 1758-1767.

* cited by examiner

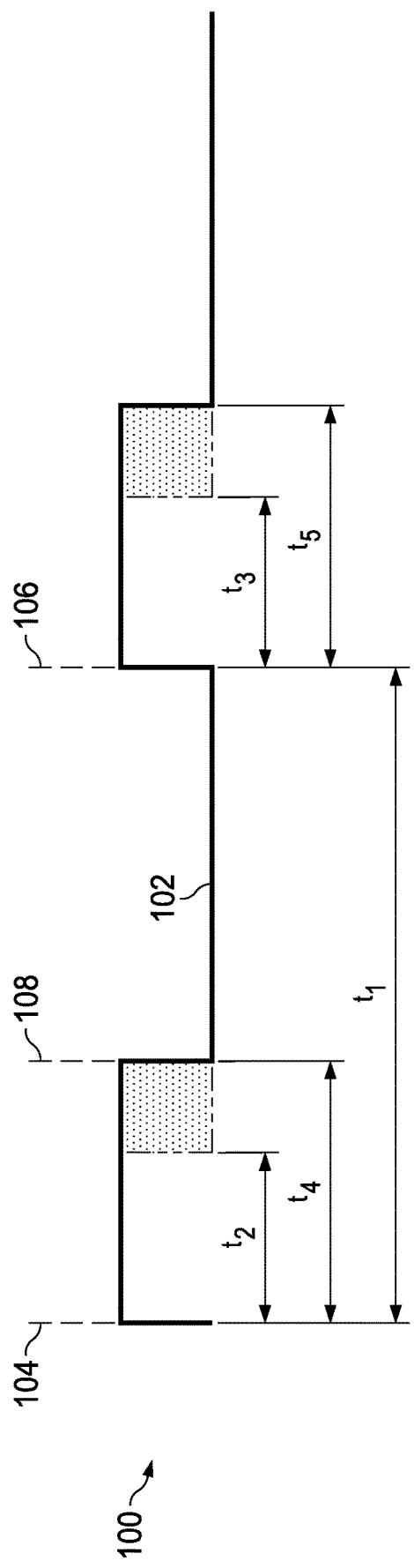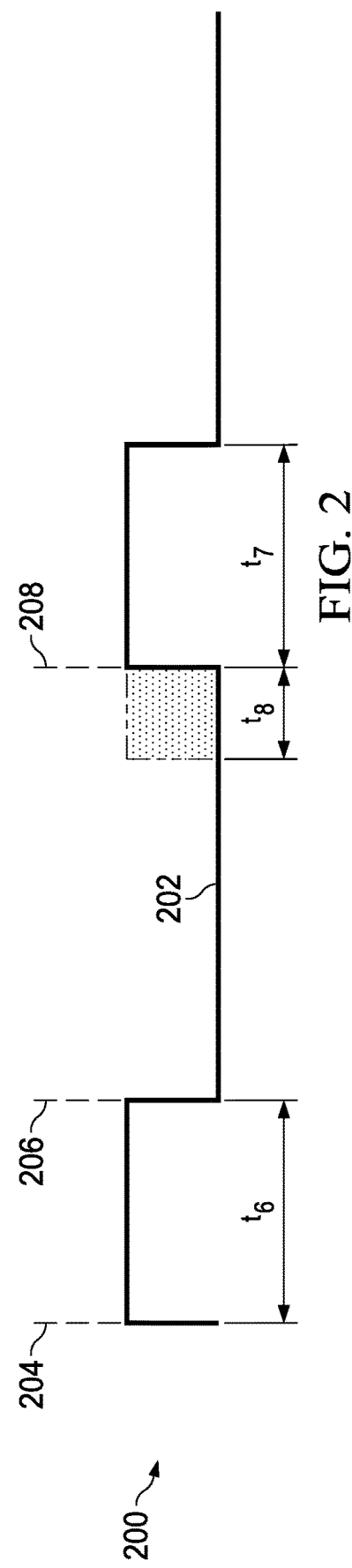

METHODS AND APPARATUS TO FACILITATE MULTIPLE MODES OF CONVERTER OPERATION

RELATED APPLICATION

This patent application claims the benefit of and priority to U.S. Provisional Patent Application Ser. No. 62/791,944 filed on Jan. 14, 2019, which is hereby incorporated herein by reference in its entirety.

FIELD OF THE DISCLOSURE

This disclosure relates generally to power converters, and, more particularly, to methods and apparatus to facilitate multiple modes of converter operation.

BACKGROUND

Power converters (e.g., buck converters, buck-boost converters, etc.) and/or various power electronic devices operate in response to a pulse width modulated signal generated by a pulse width modulated signal generator (PWM signal generator). In some power converters and/or various power electronic device applications, switches (e.g., transistors) are controlled by ramp-based PWM techniques (e.g., analog controlled). Manufacturers of power converters and/or various power electronic based devices have developed delay-based PWM techniques as an alternative to ramp-based PWM techniques. Delay-based PWM techniques involve utilizing a delayed PWM generator to generate a signal in which the pulse width is a function of a delay.

BRIEF DESCRIPTION OF THE DRAWINGS

FIG. 1 is an example plot illustrating an example PWM signal controlled in fixed frequency mode.

FIG. 2 is an example plot illustrating an example PWM signal controlled in constant-on-time mode.

FIG. 8, are an example schematic illustration of the ramp generator of FIG. 6.

DETAILED DESCRIPTION

Figure 3:
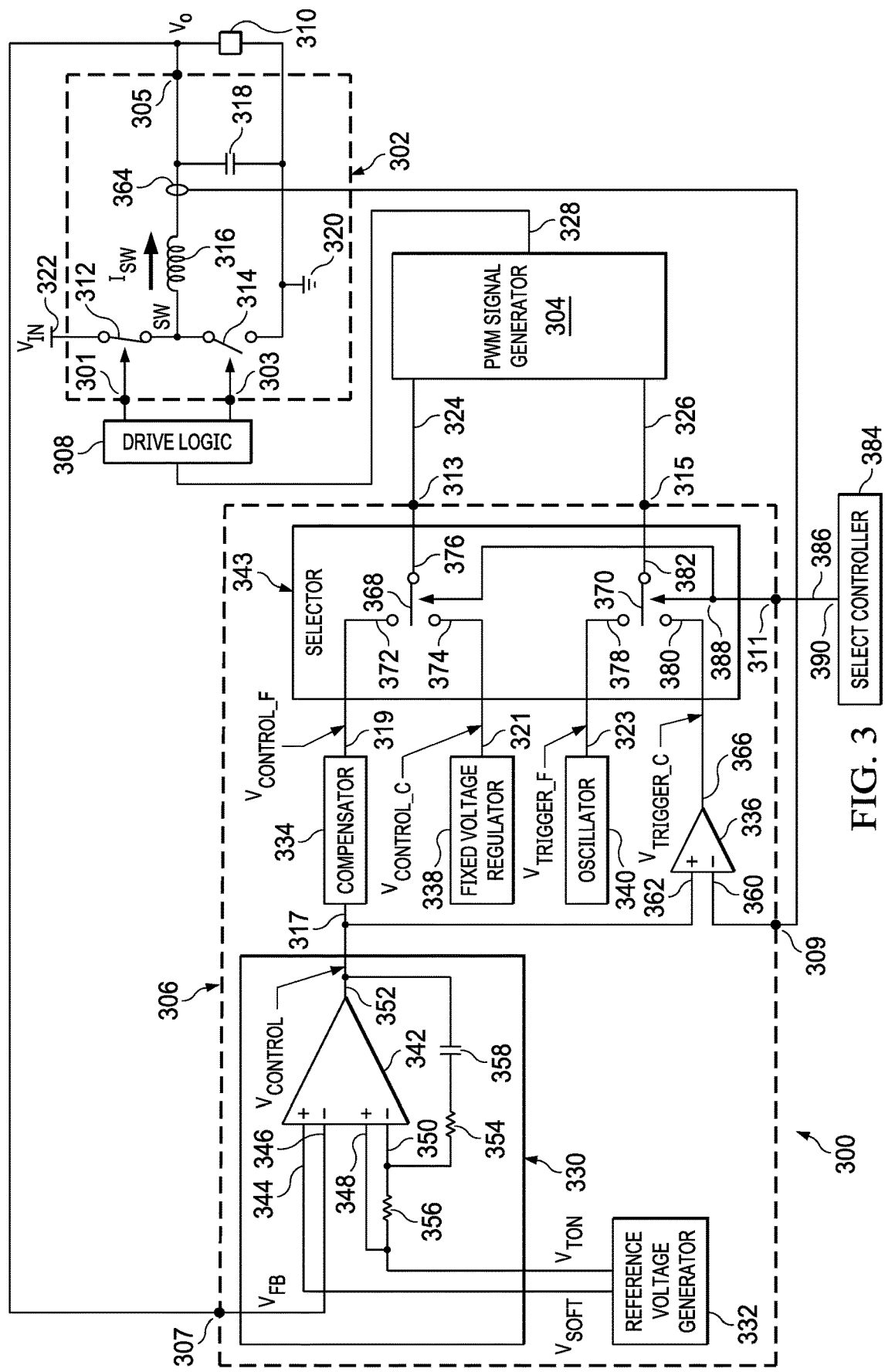
FIG. 3 is a diagram of an example power conversion system including a power stage, an example PWM signal generator, and an example PWM controller.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors first, second, third, etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor first may be used to refer to an element in the detailed description, while the same element may be referred to in a claim with a different descriptor such as second or third. In such instances, it should be understood that such descriptors are used merely for ease of referencing multiple elements or components.

Power electronic devices such as direct current to direct current (DC-DC) converters and/or alternating current (AC) inverters utilize a number of switches (e.g., transistors) controlled by a controller that generates a pulse width modulation (PWM) signal. In such applications, a PWM signal generator controlled by the controller generates and/or otherwise supplies the PWM signal to the converter in response to monitoring an output voltage of a power electronic device. The PWM signal generator may be a delay pulse width modulated (DPWM) signal generator rather than a traditional analog, ramp-based PWM signal generator. A DPWM signal generator may generate a PWM signal based on a delay time and/or period. A DPWM signal generator is advantageous over an analog, ramp-based PWM signal generator because a DPWM signal generator is capable of producing narrower pulses (e.g., pulses less than 30 nanoseconds) without jitter.

Rather than producing a PWM signal by comparing a control signal voltage with a ramp-based signal (e.g., a saw tooth signal), as done by analog, ramp-based PWM signal generators, a DPWM signal generator generates a PWM signal by introducing a delay corresponding to a desired pulse width. A DPWM signal generator includes delay cells controllable by at least one control signal. The control signal is generated by a controller and indicates the length of delay each of the plurality of delay cells is to introduce (e.g., 1.0 nanoseconds, 1.2 nanoseconds, etc.). In some examples, the DPWM signal generator is included in the controller.

Both analog, ramp-based PWM signal generators and DPWM signal generators are operable using a control method such as either fixed frequency mode or constant-on-time mode.

FIG. 1 is an example plot 100 illustrating an example PWM signal (line 102) controlled in fixed frequency mode. In FIG. 1, the frequency of the PWM signal (line 102) is fixed and, as such, the rising edge (e.g., the PWM signal (line 102) becomes a logic high) is triggered at a constant frequency. For example, the example time interval $t_1$ (e.g., the time between each successive rising edges of the PWM signal (line 102), the time between an example first time 104 and an example second time 106) is fixed. However, example time intervals $t_2$ and/or $t_3$ (e.g., the time that the PWM signal (line 102) is a logic high, the length of time between the rising edge at the first time 104 and the falling edge at an example third time 108) can be modulated. In fixed frequency mode, the signaling to turn off (e.g., make a logic low) the PWM signal (line 102) at the third time 108 may be modulated by an analog, ramp-based PWM signal generator and/or a DPWM signal generator. Such a modulation may adjust the duration of example time intervals $t_2$ and/or $t_3$. In FIG. 1, the difference between time intervals $t_4$ and $t_2$, or the difference between time intervals $t_5$ and $t_3$, may be modulated to alter the on or off time of the PWM signal (line 102).

FIG. 2 is an example plot 200 illustrating an example PWM signal (line 202) controlled in constant-on-time mode. In FIG. 2, the on-time of the PWM signal (line 202) is fixed and, as such, the PWM signal (line 202) becomes a logic high value for a constant period of time (e.g., a constant duration). For example, time intervals $t_6$ and $t_7$ (e.g., the time between a rising edge and corresponding falling edge of the PWM signal (line 202), the time between an example first time 204 and an example second time 206) are fixed. However, the time that the PWM signal (line 202) is off (e.g., the length of time between the falling edge at the second time 206 and a successive rising edge at an example third time 208) is modulated. For example, in the plot 200, the PWM signal (line 202) is a logic low value between the second time 206 and the third time 208. In FIG. 2, time interval $t_8$ corresponds to a possible modulation in the triggering of the PWM signal (line 202) at the third time 208, while maintaining a constant duration that PWM signal (line 202) is a logic high value (e.g., maintaining a constant duration of time interval $t_7$). In constant-on-time mode, the signaling to make the PWM signal (line 202) a logic high value may be modulated by a triggering circuit such as, for example, a comparator and/or any suitable triggering device and/or circuit.

Fixed frequency mode, as illustrated in FIG. 1, is advantageous as compared to constant-on-time mode for applications that are, for example, sensitive to noise within a system. Alternatively, constant-on-time mode, as illustrated in FIG. 2, is advantageous as compared to fixed frequency mode for applications that operate using, for example, a fast load transient response.

Examples disclosed herein enable a device to generate a PWM signal that is compatible with both fixed frequency mode and constant-on-time mode. Examples disclosed herein utilize a PWM signal generator configured to obtain and/or otherwise received a trigger input (e.g., a first input and/or clock input), a control input (e.g., a second input), and generate an output (e.g., a PWM signal). In examples disclosed herein, any of an analog, ramp-based pulse width modulated signal generator (analog based PWM signal generator) and/or a delay pulsed width modulated signal generator (DPWM signal generator) may be used.

In examples disclosed herein, the trigger input (e.g., the first input and/or clock input) is a trigger input to initiate a pulse in the resulting PWM signal. Additionally, the control input (e.g., the second input) is an input configured to adjust the width of a pulse in the resulting PWM signal (e.g., the control input is an input to adjust the turn-on time of the PWM signal and/or otherwise the duty cycle of the PWM signal). The output (e.g., the PWM signal) is a pulse output including a period (e.g., frequency) determined by the trigger input (e.g., the first input and/or clock) and a duration (e.g., on-time) determined by the control input (e.g., the second input).

In examples disclosed herein, such a device may operate in fixed frequency mode by ensuring the period of the trigger input (e.g., the first input and/or clock) is fixed and the control input (e.g., the second input) is variable. Likewise, such a device may operate in constant-on-time mode by ensuring the trigger input (e.g., the first input) is variable and the control input (e.g., the second input) is fixed.

Examples disclosed herein include generating a PWM signal in a manner compatible with two inherently different control topologies (e.g., fixed frequency mode operation and constant-on-time mode operation). Examples disclosed herein enable a single device to generate a PWM signal that is compatible with both fixed frequency and/or constant-on-time mode operation. In some examples disclosed herein, the pulse width of a PWM signal may be modified by, for example, adjusting the width as a function of input voltage to maintain a constant volt-seconds. In another example, the pulse width of a PWM signal may be modified to maintain a constant period. In such examples disclosed herein, the pulse width of a PWM signal is not modulated on the basis of output voltage regulation.

In addition, examples disclosed herein enable an alternate method to generate an example trigger signal during constant-on-time mode. In a conventional approach to generating a trigger signal during constant-on-time mode, the main half-bridge associated with a coupled power stage is used. In such a conventional approach, there is direct feedback of the PWM signal used to drive various switches (e.g., transistors) in the power stage. However, such a conventional approach causes propagation delay through associated gate drivers and/or power switches (e.g., power transistors) corresponding to the coupled power stage. Such a delay limits high frequency operation of the coupled power stage. Therefore, examples disclosed herein employ a small auxiliary half-bridge network (e.g., a half-bridge network including physically smaller transistors and/or switches than the transistors and/or switches included half-bridge network associated with the power stage) to reduce delay from the PWM signal.

FIG. 3 is a diagram of a power conversion system 300 including a power stage 302, a PWM signal generator 304, and a PWM signal controller 306. The power conversion system 300 of FIG. 3 further includes a drive logic network 308.

In FIG. 3, the power stage 302 is a direct current to direct current (DC-DC) buck converter. DC power converters function by temporarily storing input energy in electronic components (e.g. inductors, capacitors, inductive elements, capacitive elements, etc.) and then releasing that energy to an example load 310 at a different voltage. The power stage 302 of FIG. 3 includes a first switch 312, a second switch 314, an inductor 316, a capacitor 318, and a ground reference rail 320. The power stage 302 is further coupled to an example power supply 322. In the illustrated example of FIG. 3, each of the first switch 312 and/or the second switch 314 includes a first terminal (e.g., a current terminal), a second terminal (e.g., a current terminal), and a third terminal (e.g., a control terminal). The power stage 302 of FIG. 3 includes an example first input terminal 301, an example second input terminal 303, and an example output terminal 305.

In FIG. 3, each of the first switch 312 and/or the second switch 314 may be implemented by a transistor. For example, the first switch 312 may be an n-channel metal-oxide-semiconductor field-effect transistor (NMOS), and the second switch 314 may be a p-channel metal-oxide-semiconductor field-effect transistor (PMOS). In other examples, the first switch 312 and/or the second switch 314 are bipolar junction transistors (BJTs), junction gate field-effect transistors (JFETs), heterojunction bipolar transistors (HBTs), any suitable transistor for the application, and/or any combination thereof.

In FIG. 3, the drive logic network 308 is coupled to the power stage 302. The power stage 302 is coupled to the drive logic network 308, the load 310, and to the power supply 322.

In FIG. 3, the second terminal of the first switch 312 is coupled to the power supply 322, the first terminal of the first switch 312 is coupled to a switch node SW, and the third terminal of the first switch 312 is coupled to the drive logic network 308 via the first input terminal 301 of the power stage 302. In the example illustrated in FIG. 3, the second terminal of the second switch 314 is coupled to the switch node SW, the first terminal of the second switch 314 is coupled to the ground reference rail 320, and the third terminal of the second switch 314 is coupled to drive logic network 308 via the second input terminal 303 of the power stage 302. The inductor 316 is coupled between the switch node SW and an output voltage node $V_O$. The capacitor 318 is coupled between the output voltage node $V_O$ and the ground reference rail 320. In the example of FIG. 3, the ground reference rail 320 is coupled to the capacitor 318 and to the first terminal of the second switch 314.

In the illustrated example of FIG. 3, when the first switch 312 is closed and the second switch 314 is open, current flows from the power supply 322 (e.g., the input voltage signal $V_{IN}$) to the inductor 316 which charges at linear rate. When the inductor 316 is charging, the inductor 316 is storing energy in a magnetic field produced by the a current $I_{SW}$ flowing through the inductor 316. Additionally, when the first switch 312 is closed and the second switch 314 is open, the capacitor 318 also charges to the desired output voltage level and the load 310 is supplied with current from the power supply 322. When the first switch 312 is open, the second switch 314 is closed so that the current $I_{SW}$ can continue to flow to the load 310. The energy that is stored in the magnetic field of the inductor 316 dissipates and as it does so, generates a current (e.g., $I_{SW}$) that flows through the power stage 302 and to the load 310. When the first switch 312 is open, the currents $I_{SW}$ flowing through the power stage 302 will be equal in magnitude to the current flowing through the second switch 314. The current from the inductor 316 flows to the capacitor 318 and the load 310, while the capacitor 318 maintains the desired output voltage at the output voltage node $V_O$ of the power stage 302 and the load 310 receives the power. The current $I_{SW}$ returns to the inductor 316 by flowing through the ground reference rail 320 and the second switch 314. The switching pattern noted above allows for continuous current to flow into the load 310.

In the example of FIG. 3, the PWM signal generator 304 includes a first input terminal 324, a second input terminal 326, and an output terminal 328. The first input terminal 324 and the second input terminal 326 are coupled to the PWM signal controller 306 via an example first output terminal 313 and an example second output terminal 315 of the PWM signal controller 306, respectively. The output terminal 328 is coupled to the to the drive logic network 308. In FIG. 3, the PWM signal generator 304 is implemented using either an analog, ramp-based PWM signal generator or a DPWM signal generator. The first input terminal 324 is configured to obtain and/or otherwise receive an example control signal and the second input terminal 326 is configured to obtain and/or otherwise receive an example trigger signal. The output terminal 328 is configured to transmit, produce, generate, output, and/or otherwise send an example PWM signal for use by the drive logic network 308.

In the example illustrated in FIG. 3, the PWM signal controller 306 (e.g., pulse width modulated signal controller 306) includes an amplifying network 330, a reference voltage generator 332, a compensator 334, a comparator 336, a fixed voltage regulator 338, an oscillator 340, and a selector 343. The PWM signal controller 306 includes a first input terminal 307, a second input terminal 309, a third input terminal 311, the first output terminal 313, and the second output terminal 315. The amplifying network 330 is coupled to the reference voltage generator 332, to an example input terminal 317 of the compensator 334, and to the output voltage node $V_O$. The reference voltage generator 332 is coupled to the amplifying network 330. The input terminal 317 of compensator 334 is coupled to the amplifying network 330 and to the comparator 336. An example output terminal 319 of the compensator 334 is coupled to the selector 343. The comparator 336 is coupled to the amplifying network 330, to the compensator 334, and to the selector 343. An example output terminal 321 of the fixed voltage regulator 338 is coupled to the selector 343. An example output terminal 323 of the oscillator is coupled to the selector 343. The selector 343 is coupled to the compensator 334, the comparator 336, the fixed voltage regulator 338, the oscillator 340, and to the PWM signal generator 304. Description of the compensator 334, the comparator 336, the fixed voltage regulator 338, and the oscillator 340 is explained in further detail, below.

The amplifying network 330 includes a differential difference amplifier 342 that includes a first non-inverting input 344, a first inverting input 346, a second non-inverting input 348, a second inverting input 350, and an output 352. The first non-inverting input 344 is coupled to the reference voltage generator 332, the first inverting input 346 is coupled to the output terminal 305 of the power stage 302 via the first input terminal 307 of the PWM signal controller 306, the second non-inverting input 348 is coupled to the reference voltage generator 332 and to an example second resistor 356, and the second inverting input 350 is coupled to the reference voltage generator 332 and to the second resistor 356. Further, the amplifying network 330 includes an example first resistor 354, the second resistor 356, and an example error capacitor 358. Collectively, the first resistor 354, the error capacitor 358, the differential difference amplifier 342, and the second resistor 356 generate a control signal $V_{CONTROL}$ at the output 352 based on one or more inputs from the power stage 302 and the reference voltage generator 332.

The amplifying network 330 monitors a voltage corresponding to the output voltage at the output voltage node $V_O$ of the power stage 302. While FIG. 3 illustrates the feedback voltage signal $V_{FB}$ as being the output voltage at the output voltage node $V_O$ of the power stage 302, in other examples disclosed herein, the feedback voltage signal $V_{FB}$ may be any suitable voltage signal equivalent to, or proportional to, the output voltage at the output voltage node $V_O$ For example, the feedback voltage signal $V_{FB}$ may be a voltage signal obtained from a voltage divider coupled to the output voltage node $V_O$ of the power stage 302. In example disclosed herein, the first resistor 354, the error capacitor 358, and the second resistor 356 from a differential difference amplifier feedback network that sets a gain of the amplifying network 330 such that the amplifying network 330 can control the power stage 302 to generate a desired output voltage level at the output voltage node $V_O$ of the power stage 302. The gain of the amplifying network 330 is illustrated below, in Equation 1.

$$k = \frac{V_1}{V_2 - V_3} = 1 + \frac{R_1 + Z_1}{R_2} \qquad \text{Equation 1}$$

In Equation 1, the variable k corresponds to the gain to the amplifying network 330 as a function of frequency, the variable $V_1$ corresponds to the voltage at the output 352 of the differential difference amplifier 342, the variable $V_2$ corresponds to the voltage at the first non-inverting input 344 of the differential difference amplifier 342, the variable $V_3$ corresponds to the voltage at the first inverting input 346 of the differential difference amplifier, the variable $R_1$ corresponds to the resistance of the first resistor 354, the variable $Z_1$ corresponds to the impedance of the error capacitor 358, and the variable $R_2$ corresponds to the resistance of the second resistor 356.

During steady state operation, if the output voltage signal at the output voltage node $V_O$ of the power stage 302 deviates away from the desired level (e.g., if the feedback voltage signal $V_{FB}$ decreases from normal operating levels during transients), the differential difference amplifier feedback network (e.g., the first resistor 354, the error capacitor 358, and the second resistor 356) causes the differential difference amplifier 342 to generate the control signal $V_{CONTROL}$ at the output 352. For example, any voltage existing across the second inverting input terminal 350 and the second non-inverting input terminal 348 (e.g., a voltage existing across the first non-inverting input terminal 344 and the first inverting input terminal 346) induces and/or otherwise causes a current to conduct through the second resistor 356. In the topology of FIG. 3, the current conducting through the second resistor 356 is equivalent the current conducting through the first resistor 345 and the error capacitor 358. Thus a voltage at the output 352 of the differential difference amplifier 342 is generated responsive to a voltage existing across the second inverting input terminal 350 and the second non-inverting input terminal 348 (e.g., a voltage existing across the first non-inverting input terminal 344 and the first inverting input terminal 346).

Accordingly, the voltage at the output 352 is a function of the gain of the differential difference amplifying network 342, as described above. In other examples disclosed herein, any suitable logic circuit and/or device may be utilized to implement the amplifying network 330.

In the example illustrated in FIG. 3, the reference voltage generator 332 is a combination of one or more voltage regulators, amplifiers, comparators, and other logic devices that regulates one or more voltage levels in the PWM signal controller 306. For example, the reference voltage generator 332 generates a first voltage signal $V_{SOFT}$ for the first non-inverting input terminal 344 at a first voltage level. For example, the first voltage signal $V_{SOFT}$ is at a reference voltage level corresponding to soft startup of the power stage 302 such that the power stage 302 ramps up to a desired and/or predetermined voltage level. Additionally, the reference voltage generator 332 generates a trimmed voltage signal $V_{TON}$ (e.g., at a second voltage level) to serve as a reference voltage level for the amplifying network 330.

The compensator 334 (e.g., fixed frequency control signal generator) is a combination of one or more voltage regulators, amplifiers, comparators, and other logic devices that regulates the voltage level of the control signal ($V_{CONTROL}$). For example, the compensator 334 (e.g., fixed frequency control signal generator) may generate a first voltage signal for the first non-inverting input terminal 344 at a first voltage level. In examples disclosed herein, the compensator 334 outputs a fixed frequency control signal ($V_{CONTROL\_F}$) to adjust a width of a pulse width modulated signal. In examples disclosed herein, the compensator 334 may be referred to as a fixed frequency control signal generator.

The comparator 336 of FIG. 3 (e.g., constant-on-time trigger signal generator) is an analog comparator. In other examples, the comparator 336 (e.g., constant-on-time trigger signal generator) is a digital comparator, a comparator controller, a trigger (e.g., a Schmitt trigger), one or more integrated circuits, logic circuits, microprocessors, graphic processing units (GPUs), digital signal processors (DSPs), or controllers from any desired family or manufacturer. The comparator 336 (e.g., constant-on-time trigger signal generator) may be a semiconductor based (e.g., silicon based) device. The comparator 336 (e.g., constant-on-time trigger signal generator) compares a voltage representative of the magnetic field of the inductor 316 (e.g., a voltage proportional to the inductor current ($I_{SW}$)) received at an example first input terminal 360 via the second input terminal 309 and the control voltage signal $V_{CONTROL}$ received at an example second input terminal 362 and determines whether the voltage representative of the magnetic field of the inductor 316 (e.g., a voltage proportional to the inductor current ($I_{SW}$)) is less than or equal to the control voltage signal $V_{CONTROL}$. In examples disclosed herein, the first input terminal 360 is coupled to an example hall-effect sensor 364. In operation, the hall-effect sensor 364 is a device that measures the magnetic field of the inductor 316 and generates a corresponding voltage that is proportional to the magnetic field of the inductor 316. The comparator 336 (e.g., constant-on-time trigger signal generator) is configured to generate an example constant-on-time trigger signal $V_{TRIGGER\_C}$ at an example output terminal 366 in response to detecting that the voltage representative of the magnetic field of the inductor (e.g., a voltage proportional to the inductor current ($I_{SW}$)) is less than or equal to the control voltage signal $V_{CONTROL}$. In examples disclosed herein, the signal produced at the output terminal 366 of the comparator 336 (e.g., constant-on-time trigger signal generator) is an example trigger signal corresponding to constant-on-time mode (e.g., $V_{TRIGGER\_C}$). In examples disclosed herein, the comparator 336 outputs a constant-on-time trigger signal ($V_{TRIGGER\_C}$) to initiate a pulse width modulated signal. In examples disclosed herein, the comparator 336 may be referred to as a constant-on-time trigger signal generator.

In other examples disclosed herein, the comparator 336 may be configured to compare the control voltage signal $V_{CONTROL}$ received at the second input terminal 362 with any suitable current and/or voltage signal. For example, the comparator 336 may compare the control voltage signal $V_{CONTROL}$ received at the second input terminal 362 with an emulated current signal generated and/or otherwise obtained from a suitable emulated current sensing network. In such an example, the emulated current signal may correspond to the current conducting through the inductor 316 (inductor current ($I_{SW}$)). In another example disclosed herein, the comparator 336 may compare the control voltage signal $V_{CONTROL}$ received at the second input terminal 362 with a voltage and/or current ramp signal (e.g., a sawtooth voltage signal) generated by any suitable logic device and/or circuit configured to generate a ramp signal. In another example disclosed herein, the comparator 336 may compare the control voltage signal $V_{CONTROL}$ received at the second input terminal 362 with voltage signal proportional to and/or otherwise representative of the current conducting through the inductor 316. For example, any suitable direct current sensing and/or indirect current sensing method (e.g., a Hall effect sensor, an induction transformer, a resistive shunt network, a Rogowski coil sensor, etc.) of the inductor 316 may be used. As such, in other examples disclosed herein, the comparator 336 may compare the control voltage signal $V_{CONTROL}$ received at the second input terminal 362 with a voltage and/or current signal generated using any of a ramp-based signal generator, a direct inductor current sensor, an indirect inductor current sensor, and/or an emulated inductor current sensor.

Alternatively, in other examples disclosed herein, the operation of the comparator 336 of FIG. 3 may be performed utilizing an auxiliary half bridge (e.g., auxiliary h-bridge) network in order to generate the trigger signal $V_{TRIGGER\_C}$. Such an example disclosed herein in discussed in further detail below, in connection with FIG. 8.

In the example illustrated in FIG. 3, the fixed voltage regulator 338 (e.g., constant-on-time control signal generator) is coupled to the selector 343 to provide, generate, send, output, and/or otherwise transmit an example control signal corresponding to constant-on-time mode (e.g., $V_{CONTROL\_C}$). In examples disclosed herein, the fixed voltage regulator 338 outputs a constant-on-time mode control signal ($V_{CONTROL\_C}$) to adjust a width of a pulse width modulated signal. In FIG. 3, the fixed voltage regulator 338 (e.g., constant-on-time control signal generator) is a combination of one or more voltage regulators, amplifiers, comparators, and other logic that regulates control signal corresponding to constant-on-time mode (e.g., $V_{CONTROL\_C}$). For example, the fixed voltage regulator 338 (e.g., constant-on-time control signal generator) generates the control signal corresponding to constant-on-time mode (e.g., $V_{CONTROL\_C}$) as a constant voltage signal for use when operating in constant-on-time mode. In the topology of FIG. 3, the fixed voltage regulator 338 (e.g., constant-on-time control signal generator) is illustrated external to the reference voltage generator 332. However, in other examples disclosed herein, the fixed voltage regulator 338 (e.g., constant-on-time control signal generator) may be included in the reference voltage generator 332 operable to generator the control signal corresponding to constant-on-time mode (e.g., $V_{CONTROL\_C}$). In examples disclosed herein, the fixed voltage regulator 338 may be referred to as a constant-on-time control signal generator.

In the illustrated example of FIG. 3, the oscillator 340 (e.g., fixed frequency trigger signal generator) is coupled to the selector 343 to provide and/or otherwise transmit an example trigger signal corresponding to fixed frequency mode (e.g., $V_{TRIGGER\_F}$). In examples disclosed herein, the oscillator 340 outputs a fixed frequency trigger signal ($V_{TRIGGER\_F}$) to initiate a pulse width modulated signal. In FIG. 3, the oscillator 340 (e.g., fixed frequency trigger signal generator) is a phase lock looped oscillator. In other examples, the oscillator 340 (e.g., fixed frequency trigger signal generator) is a capacitor (RC) oscillator, a ring oscillator, a crystal oscillator, or any other suitable oscillator for the application. In FIG. 3, the oscillator 340 (e.g., fixed frequency trigger signal generator) produces an oscillating signal to act as a trigger signal when operating in fixed-frequency mode (e.g., $V_{TRIGGER\_F}$). In examples disclosed herein, the oscillator 340 may be referred to as a fixed frequency trigger signal generator.

The selector 343 of FIG. 3 is coupled to the compensator 334, the comparator 336, the fixed voltage regulator 338, the oscillator 340, and to the PWM signal generator 304. The selector includes a control switch 368 and a trigger switch 370. The control switch 368 includes a first input terminal 372, a second input terminal 374, and an output terminal 376. In the example of FIG. 3, the first input terminal 372 of the control switch 368 may be an example first input terminal of the selector 343. Likewise, the second input terminal 374 of the control switch 368 may be an example second input terminal of the selector 343. In examples disclosed herein, the selector 343 may be referred to as a switch network.

The trigger switch 370 includes a first input terminal 378, a second input terminal 380, and an output terminal 382. In the example of FIG. 3, the first input terminal 378 of the trigger switch 370 may be an example third input terminal of the selector 343. Likewise, the second input terminal 380 of the trigger switch 370 may be an example fourth input terminal of the selector 343. In FIG. 3, the first input terminal 372 of the control switch 368 is coupled to the compensator 334 to obtain and/or otherwise receive the control signal corresponding to fixed frequency mode (e.g., $V_{CONTROL}$). In this manner, the compensator 334 is configured to provide the fixed frequency control signal (e.g., $V_{CONTROL\_F}$). The second input terminal 374 of the control switch 368 is coupled to the fixed voltage regulator 338 to obtain and/or otherwise receive the control signal corresponding to constant-on-time mode (e.g., $V_{CONTROL\_F}$). In this manner, the fixed voltage regulator 338 is configured to provide the constant-on-time control signal (e.g., $V_{CONTROL\_C}$). The first input terminal 378 of the trigger switch 370 is coupled to the oscillator 340 to obtain and/or otherwise receive the trigger signal corresponding to fixed frequency mode (e.g., $V_{TRIGGER\_F}$). In this manner, the oscillator 340 is configured to provide the fixed frequency trigger signal (e.g., $V_{TRIGGER\_F}$). The second input terminal 380 of the trigger switch 370 is coupled to the comparator 336 to obtain and/or otherwise receive the trigger signal corresponding to constant-on-time mode (e.g., $V_{TRIGGER\_C}$). In this manner, the comparator 336 is configured to provide the constant-on-time trigger signal (e.g., $V_{TRIGGER\_C}$). As such, the selector 343 is configured to obtain the fixed frequency control signal (e.g., $V_{CONTROL\_F}$), the constant-on-time control signal (e.g., $V_{CONTROL\_C}$), the fixed frequency trigger signal (e.g., $V_{TRIGGER\_F}$), and the constant-on-time trigger signal (e.g., $V_{TRIGGER\_C}$).

In operation, the selector 343 is configured to operate the control switch 368 and the trigger switch 370 to select either the first input terminals 372, 378 or the second input terminals 374, 380. An example fifth output terminal 388 (e.g., a select terminal) of the selector 343 is further configured to be coupled to an example output terminal 390 of an example select controller 384 to obtain and/or otherwise receive an example select signal (line 386) via the third input terminal 311 of the PWM signal controller 306. When the select signal (line 386) indicates fixed-frequency mode operation, the first input terminals 372, 378 are selected, and, as such, the selector 343 obtains the fixed-frequency control signal ($V_{CONTROL\_F}$) from the compensator 334 and the fixed-frequency trigger signal ($V_{TRIGGER\_F}$) from the oscillator 340. When the select signal (line 386) indicated constant-on-time mode operation, the second input terminals 374, 380 are selected and, as such, the selector 343 obtains the constant-on-time control signal ($V_{CONTROL\_C}$) from the fixed voltage regulator 338 and the constant-on-time trigger signal ($V_{TRIGGER\_C}$) from the comparator 336. The select signal (line 386) may be a suitable digital and/or analog signal obtained from a digital register in the select controller 384. In examples disclosed herein, the digital registers are programmed during configuration of the power conversion system 300. As such, the selector 343 is configured to output the fixed frequency control signal (e.g., $V_{CONTROL\_F}$), the constant-on-time control signal (e.g., $V_{COMMAND\_C}$), the fixed frequency trigger signal (e.g., $V_{TRIGGER\_F}$), and the constant-on-time trigger signal (e.g., $V_{TRIGGER\_C}$) in response to the select signal (line 386).

In FIG. 3, the selector 343, and more specifically any of the control switch 368 and/or the trigger switch 370, may be implemented using a multiplexor. For example, the control switch 368 may be implemented using a two-to-one multiplexor and, likewise, the trigger switch 370 may be implemented using a two-to-one multiplexor. Alternatively, the control switch 368 and/or the trigger switch 370 may be implemented together using a four-to-two multiplexor. An alternate embodiment to implement the selector 343 using a plurality of logic gates is shown in further detail below, in connection with FIG. 7. Alternatively, in some examples disclosed herein, any of the control switch 368 and/or the trigger switch 370 may be implemented utilizing any suitable switching device (e.g., a metal-oxide-semiconductor field-effect transistor (MOSFET), bipolar junction transistor (BJT), a double pole single throw (DPST) switch, etc.).

In the example illustrated in FIG. 3, the drive logic network 308 may be a combination of logic circuits that ensures that the first switch 312 and the second switch 314 are not closed at the same time. The drive logic network 308 ensures that when the first switch 312 is closed, the second switch 314 is open, and that when the second switch 314 is closed, the first switch 312 is open.

In the example illustrated in FIG. 3, the load 310 is a sub-circuit of a microcontroller. In other examples, the load 310 may be an LED array in an EV, a motor, a server, industrial and/or residential appliances, a datacom server, or any suitable load.

In the illustrated example of FIG. 3, the power supply 322 is an unregulated linear power supply. For example, the power supply 322 is the output of diode rectifier. In other examples, other power supplies may be used that are suitable to the application. The power supply 322 generates the input voltage signal $V_{IN}$.

Figure 4:
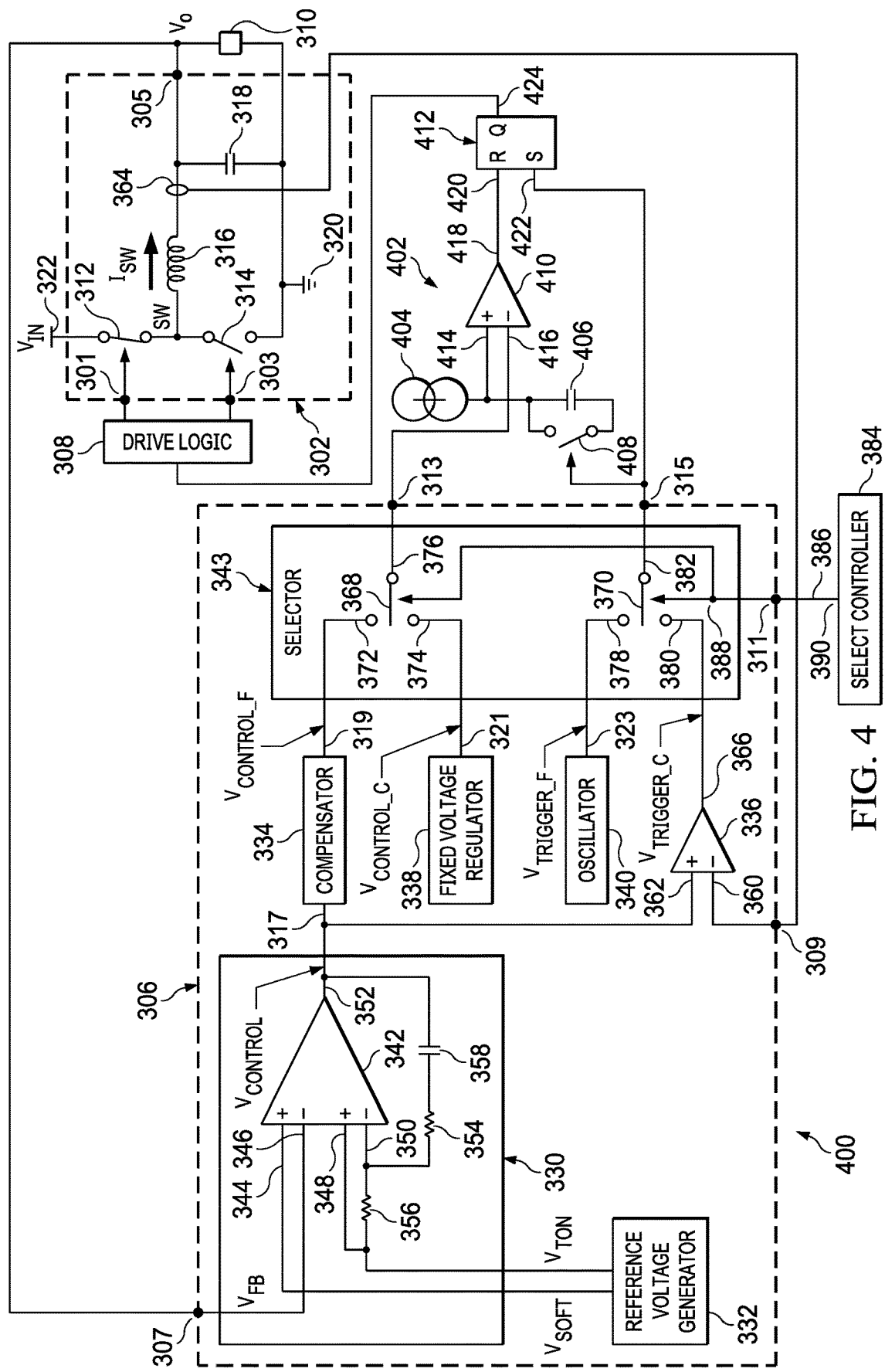
FIG. 4 is a diagram of an example power conversion system including an example analog, ramp-based PWM signal generator.

FIG. 4 is a diagram of an example power conversion system 400 including an analog, ramp-based PWM signal generator 402. In FIG. 4, the PWM signal generator 304 of FIG. 3 is replaced by the analog, ramp-based PWM signal generator 402. The analog, ramp-based PWM signal generator 402 includes a current source network 404, a capacitor 406, an enable switch 408, a comparator 410, and a reset-set (RS) latch 412. The comparator 410 includes a first input terminal 414, a second input terminal 416, and an output terminal 418. The RS latch 412 includes a first input terminal 420, a second input terminal 422, and an output terminal 424. Though the topology of FIG. 4 includes the analog, ramp-based PWM signal generator 402 including the current source network 404, the capacitor 406, the enable switch 408, the comparator 410, and the reset-set (RS) latch 412, any suitable electronic device, electronic network, logic device, and/or logic network may be utilized to implement the analog, ramp-based PWM signal generator 402.

In the example illustrated in FIG. 4, the first input terminal 414 of the comparator 410 is coupled to the current source network 404, to the capacitor 406, and to the enable switch 408. The second input terminal 416 of the comparator 410 is coupled to the output terminal 376 of the control switch 368 via the first output terminal 313 of the PWM signal controller 306. The output terminal 418 of the comparator 410 is coupled to the first input terminal 420 of the RS latch 412. The second input terminal 422 of the RS latch 412 is coupled to the output terminal 382 of the trigger switch 370 via the second output terminal 315 of the PWM signal controller 306. The output terminal 424 of the RS latch 412 is coupled to the drive logic network 308. The first input terminal 414 of the comparator 410 is the non-inverting input terminal and the second input terminal 416 of the comparator 410 is the inverting input terminal. The first input terminal 420 of the RS latch 412 is the reset terminal and the second input terminal 422 of the RS latch 412 is the set terminal.

In operation, the comparator 410 is configured to obtain, via the first input terminal 414, a ramp-based voltage signal corresponding to the voltage across the capacitor 406. If the trigger signal (e.g., $V_{TRIGGER\_F}$ or $V_{TRIGGER\_C}$) is a logic high value, then the enable switch 408 will close and the capacitor 406 will be shorted. Alternatively, if the trigger signal (e.g., $V_{TRIGGER\_F}$ or $V_{TRIGGER\_C}$) is a logic low value, then the enable switch 408 will be open and the capacitor 406 will begin to charge to a threshold voltage. The voltage across the capacitor 406 represents the ramp-based signal coupled to the first input terminal 414 of the comparator 410. Likewise, the comparator 410 is configured to obtain, via the second input terminal 416, an example control signal (e.g., $V_{CONTROL\_F}$ or $V_{CONTROL\_C}$) from the output terminal 376 of the control switch 368. The comparator 410 is configured to generate an example turn-on signal at the output terminal 418 in response to determining that the voltage across the capacitor 406 (e.g., the ramp-based signal) is greater than or equal to the control signal (e.g., $V_{CONTROL\_F}$ or $V_{CONTROL\_C}$).

In response, the RS latch 412 is configured to generate an example PWM signal as a logic high value at the output terminal 424 in response to the turn-on signal from the output terminal 418 of the comparator 410 being a logic high. In addition, the RS latch 412 is configured to generate an example PWM signal as a logic low value at the output terminal 424 in response to the trigger signal (e.g., $V_{TRIGGER\_F}$ or $V_{TRIGGER\_C}$) from the output terminal 382 of the enable switch 370 being a logic high value.

In the topology illustrated in FIG. 4, the analog, ramp-based PWM signal generator 402 is configured to operate in either fixed frequency mode or constant-on-time mode.

Figure 5:
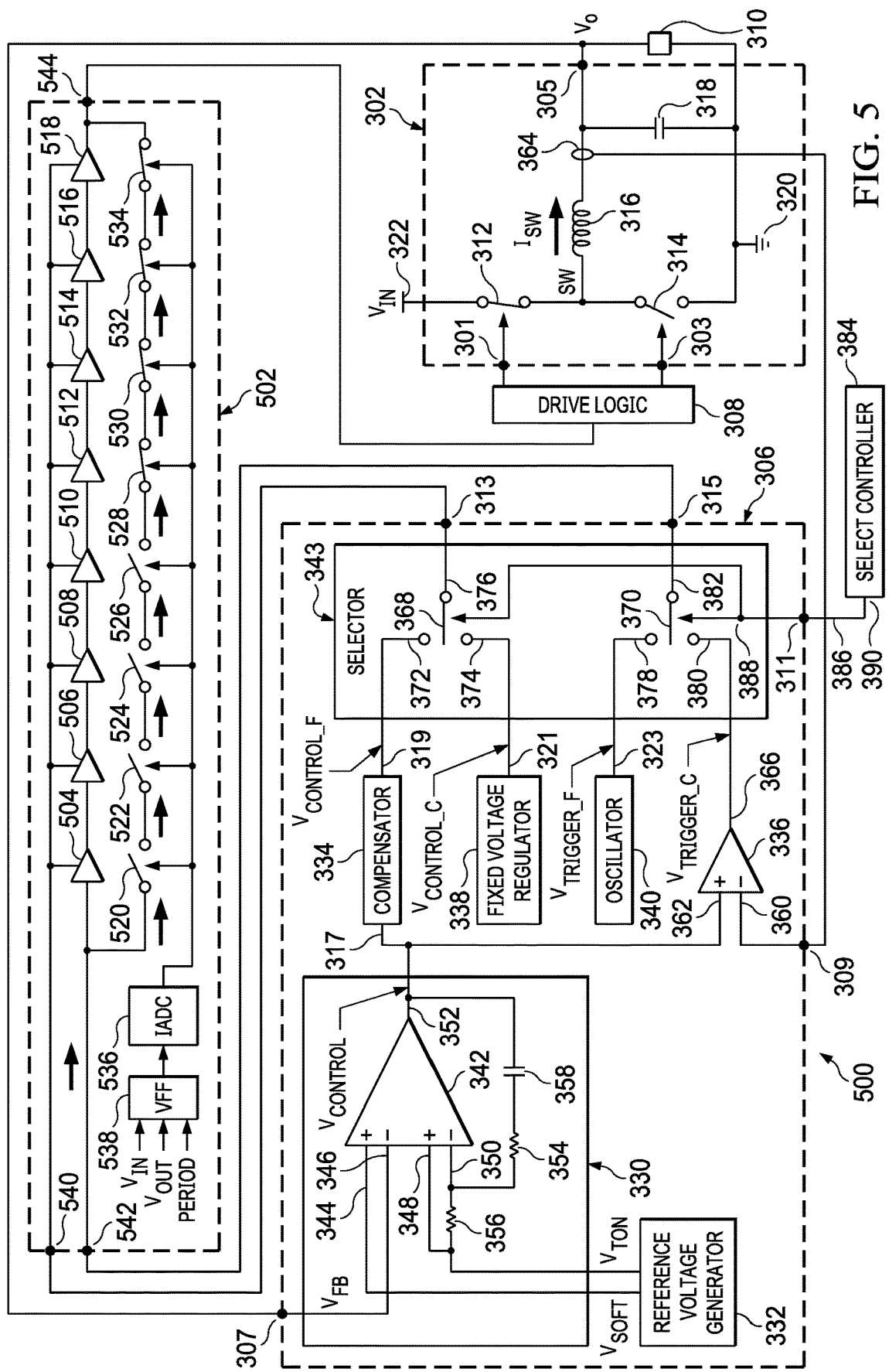
FIG. 5 is a diagram of an example power conversion system including an example DPWM signal generator.

FIG. 5 is a diagram of an example power conversion system 500 including a DPWM signal generator 502. In FIG. 5, the PWM signal generator 304 of FIG. 3 is replaced by the DPWM signal generator 502. The DPWM signal generator 502 includes a first delay cell 504, a second delay cell 506, a third delay cell 508, a fourth delay cell 510, a fifth delay cell 512, a sixth delay cell 514, a seventh delay cell 516, and an eighth delay cell 518. While the topology of FIG. 5 includes eight delay cells (e.g., the first delay cell 504, the second delay cell 506, the third delay cell 508, the fourth delay cell 510, the fifth delay cell 512, the sixth delay cell 514, the seventh delay cell 516, and the eighth delay cell 518) and suitable number of delay cells and/or combination of delay cells may be utilized (e.g., four delay cells, 15 delay cells, 50 delay cells, etc.). In FIG. 5, a first switch 520 is coupled in parallel to the first delay cell 504, a second switch 522 is coupled in parallel to the second delay cell 506, a third switch 524 is coupled in parallel to the third delay cell 508, a fourth switch 526 is coupled in parallel to the fourth delay cell 510, a fifth switch 528 is coupled in parallel to the fifth delay cell 512, a sixth switch 530 is coupled in parallel to the sixth delay cell 514, a seventh switch 532 is coupled in parallel to the seventh delay cell 516, and an eighth switch 534 is coupled in parallel to the eighth delay cell 518. In addition, the DPWM signal generator 502 further includes an analog-to-digital converter 536 and a feed forward voltage controller 538. The DPWM signal generator 502 includes a first input terminal 540, a second input terminal 542, and an output terminal 544. In the topology of FIG. 5, the first input terminal 540 of the DWPM signal generator 502 is coupled to the output terminal 376 of the control switch 368 via the first output terminal 313 of the PWM signal controller 306. The second input terminal 542 of the DWPM signal generator 502 is coupled to the output terminal 382 of the trigger switch 370 via the second output terminal 315 of the PWM signal controller 306. The output terminal 544 of the DWPM signal generator 502 is coupled to the drive logic network 308.

In FIG. 5, the delay cells 504-518 are controllable by a control signal (e.g., $V_{CONTROL\_F}$ or $V_{CONTROL\_C}$) and/or a trigger signal (e.g., $V_{TRIGGER\_F}$ or $V_{TRIGGER\_C}$). The control signal (e.g., $V_{CONTROL\_F}$ or $V_{CONTROL\_C}$) and/or a trigger signal (e.g., $V_{TRIGGER\_F}$ or $V_{TRIGGER\_C}$) indicates the length of delay each of the plurality of delay cells is to introduce (e.g., 1.0 nanoseconds, 1.2 nanoseconds, etc.). In operation, the delay cells 504-518 generate a PWM signal at the output terminal 544 by introducing a delay to the trigger signal (e.g., $V_{TRIGGER\_F}$ or $V_{TRIGGER\_C}$) based on one or more of the input voltage $V_{IN}$ and/or the first voltage signal $V_{SOFT}$. The delay cells 504-518 are used to provide the PWM signal to the drive logic network 308. In the example of FIG. 5, the duration of each delay of the delay cells 504-518 is determined based on the control signal (e.g., $V_{CONTROL\_F}$ or $V_{CONTROL\_C}$).

In the topology illustrated in FIG. 5, the DPWM signal generator 502 is configured to operate in either fixed frequency mode or constant-on-time mode.

Figure 6:
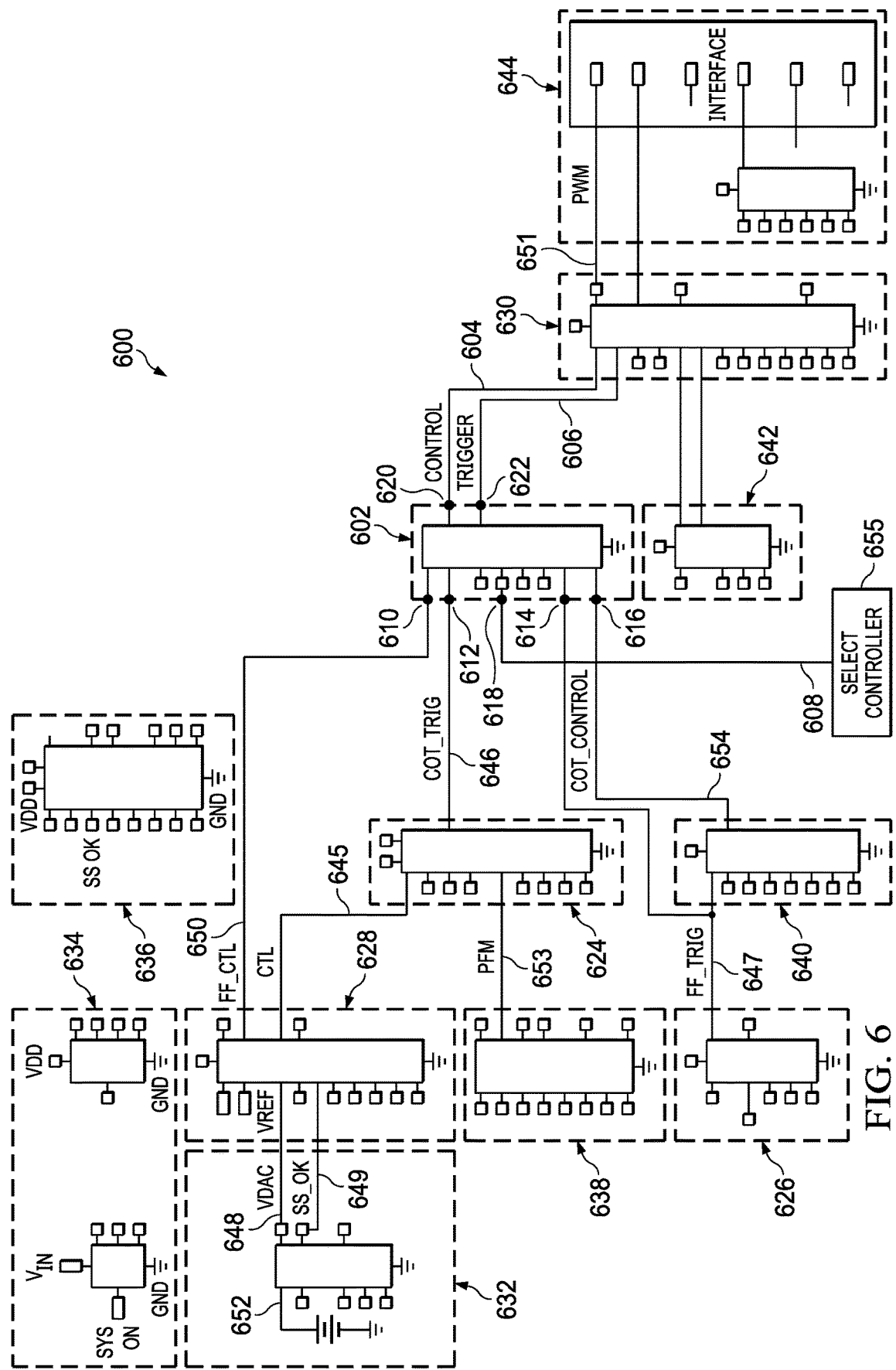
FIG. 6 is a diagram of an example power conversion system illustrating example implementations of various components of FIGS. 3, 4, and/or 5.

FIG. 6 is a diagram of an example power conversion system 600 illustrating an example implementation of various components of FIGS. 3, 4, and/or 5. FIG. 6 includes a selector 602 configured to generate a control signal (line 604) and a trigger signal (line 606) in response to a select signal (line 608). In the example of FIG. 6, the selector 602 may represent the selector 343 of FIGS. 3, 4, and/or 5. The selector 602 includes a first input terminal 610, a second input terminal 612, a third input terminal 614, a fourth input terminal 616, a fifth input terminal 618, a first output terminal 620, a second output terminal 622. Furthermore, the power conversion system 600 includes a ramp generator 624, an oscillator 626, a feedback amplifier 628, a PWM signal generator 630, a soft-start controller 632, a biasing network 634, a fault protection network 636, a PFM control network 638, a phase controller 640, a feed forward voltage controller 642, and a power converter interface 644. Furthermore, the selector 602 is coupled to an example select controller 655 in order to obtain the select signal (line 608). The selector 602 is explained in further detail below, in connection with FIG. 7.

In the example of FIG. 6, the ramp generator 624 may be implemented by the comparator 336 of FIGS. 3, 4, and/or 5. The ramp generator 624 is coupled to the selector 602, to the feedback amplifier 628, and to the PFM control network 638. The ramp generator 624 is configured to obtain a first example control signal (line 645, CTL) from the feedback amplifier 628. In examples disclosed herein, the first example control signal (line 645) may be the control signal ($V_{CONTROL}$) illustrated in FIGS. 3, 4, and/or 5. The ramp generator 624 is configured to generate an example constant-on-time trigger signal (line 646, COT_TRIG) (e.g., $V_{TRIGGER\_C}$ of FIGS. 3, 4, and/or 5) for use by the selector 602. The operation of the ramp generator 624 is explained in an example illustration below, in connection with FIG. 8. In examples disclosed herein, the ramp generator 624 may be implemented using any number of logic gates and/or logic circuits, controllers, processors, and/or any suitable hardware device.

In FIG. 6, the oscillator 626 may be implemented by the oscillator 340 of FIGS. 3, 4, and/or 5. The oscillator 626 is coupled to the selector 602 and to the phase controller 640. In the example of FIG. 6, the oscillator 626 is configured to provide an example fixed frequency trigger signal (line 647, FF_TRIG) to the selector 602 and to the phase controller 640. The fixed-frequency trigger signal (line 647) may be implemented as the fixed-frequency trigger signal ($V_{TRIGGER\_F}$) illustrated in FIGS. 3, 4, and/or 5. In examples disclosed herein, the oscillator 626 may be implemented using any suitable device to generate the fixed-frequency trigger signal (line 647) (e.g., a ring oscillator, a crystal oscillator, a plurality of logic gates, etc.).

In the example of FIG. 6, the feedback amplifier 628 may be implemented by the amplifying network 330 and/or the compensator 334 of FIGS. 3, 4, and/or 5. The feedback amplifier 628 is coupled to the soft-start controller 632, to the selector 602, and to the ramp generator 624. In operation, the feedback amplifier 628 obtains an example reference voltage signal (line 648, VDAC and/or VREF) and an example SSOK signal (line 649) and generates the first control signal (line 645) and an example second control signal (line 650, FF_CTL). In examples disclosed herein, the second control signal (line 650) may be implemented as the fixed-frequency control signal ($V_{CONTROL\_F}$) as illustrated in FIGS. 3, 4, and/or 5. In examples disclosed herein, the feedback amplifier 628 may be implemented using any number of logic gates and/or logic circuits, controllers, processors, and/or any suitable hardware device.

In the example of FIG. 6, the PWM signal generator 630 is implemented by a DPWM signal generator (e.g., the DPWM signal generator 502 of FIG. 5). Alternatively, in other examples disclosed herein, the PWM signal generator 630 may be implemented by the PWM signal generator 304 of FIG. 3 or the analog, ramp-based PWM signal generator 402 of FIG. 4. The PWM signal generator 630 obtains the control signal (line 604) and the trigger signal (line 606) from the selector 602. In the example illustrated in FIG. 6, the control signal (line 604) may be the control signal that is generated at the output terminal 376 of control switch 368 of FIG. 3. Likewise, the trigger signal (line 606) may be the trigger signal that is generated at the output terminal 382 of the trigger switch 370 of FIG. 3. The PWM signal generator 630 is operable to generate an example PWM signal (line 651) for use by the power converter interface 644. In examples disclosed herein, the PWM signal generator 630 may be implemented using any number of logic gates and/or logic circuits, controllers, processors, and/or any suitable hardware device.

In FIG. 6, the soft-start controller 632 is coupled to the feedback amplifier 628 to provide the reference voltage signal (line 648) and an example SSOK signal (line 649). In examples disclosed herein, the soft-start controller 632 supports the start-up of a coupled power converter (e.g., any suitable power converter coupled to the power converter interface 644) and/or otherwise regulates the rate of rise of an example input voltage single (line 652) so as to regulate in-rush current into the coupled power converter (e.g., any suitable power converter coupled to the power converter interface 644). In examples disclosed herein, the soft-start controller 632 may be implemented using any number of logic gates and/or logic circuits, controllers, processors, and/or any suitable hardware device.

In the example of FIG. 6, the biasing network 634 is coupled to various logic gates, logic circuits, components, and/or devices included in the power conversion system 600 to act as a biasing controller for the various logic gates and/or logic circuits. In operation, the biasing network 634 is configured to establish voltages and/or currents at various points (e.g., to various inputs and/or outputs of the various logic gates, logic circuits, components, and/or devices) in the power conversion system 600. In examples disclosed herein, the biasing network 634 may be implemented using any number of logic gates and/or logic circuits, controllers, processors, and/or any suitable hardware device.

In the example of FIG. 6, the fault protection network 636 is coupled to various logic gates, logic circuits, components, and/or devices included in the power conversion system 600. In operation, the fault protection network 636 is configured to prevent unwanted currents and/or voltages occurring in the power conversion system 600. In examples disclosed herein, the fault protection network 636 may be implemented using any of a protective relay, diode(s), insulated networks, and/or any suitable fault protection network and/or device.

In FIG. 6, the example PFM control network 638 is coupled to the ramp generator 624. In operation, the PFM control network 638 is configured to supply a PFM control voltage signal (line 653, PFM) (e.g., $V_{CONTROL\_P}$) during power save operation. In other examples disclosed herein, the PWM control network 638 may be implemented using any number of logic gates and/or logic circuits, controllers, processors, and/or any suitable hardware device.

In the example of FIG. 6, the phase controller 640 is implemented using a phase-locked loop oscillator configured to adjust the pulse width of the fixed frequency trigger signal (line 647) to ensure the frequency in constant-on-time mode is equal to the frequency in fixed frequency mode. In FIG. 6, the phase controller 640 is coupled to the oscillator 626 and to the selector 602. In operation, the phase controller 640 is configured to provide an example constant-on-time control voltage signal (line 654) (e.g., $V_{CONTROL\_F}$ of FIGS. 3, 4, and/or 5) to the selector 602. In examples disclosed herein, the phase controller 640 may be implemented using any number of logic gates and/or logic circuits, controllers, processors, and/or any suitable hardware device. In the example of FIG. 6, the phase controller 640 may be implemented by the fixed voltage regulator 338 of FIGS. 3, 4, and/or 5.

In other examples disclosed herein, some or all of the biasing network 634, the fault protection network 636, the PFM control network 638, and/or phase controller 640 can be absent from the power conversion system 600.

In FIG. 6, the example feed forward voltage controller 642 is coupled to the PWM signal generator 630. In FIG. 6, the PWM signal generator 630 is implemented as a DPWM signal generator. In other examples disclosed herein in which the PWM signal generator 630 is implemented as an analog, ramp-based PWM signal generator, the feed forward voltage controller 642 may not be included. In examples disclosed herein, the feed forward voltage controller 642 may be implemented using any number of logic gates and/or logic circuits, controllers, processors, and/or any suitable hardware device.

In the example of FIG. 6, the power converter interface 644 is coupled to the PWM signal generator 630 to obtain the PWM signal (line 651). In operation, power converter interface 644 is configured to drive any number of switches (e.g., transistors) in a coupled power converter in order to supply a desired voltage to a load. In examples disclosed herein, the power converter interface 644 may be implemented using any number of logic gates and/or logic circuits, controllers, processors, and/or any suitable hardware device.

Figure 7:
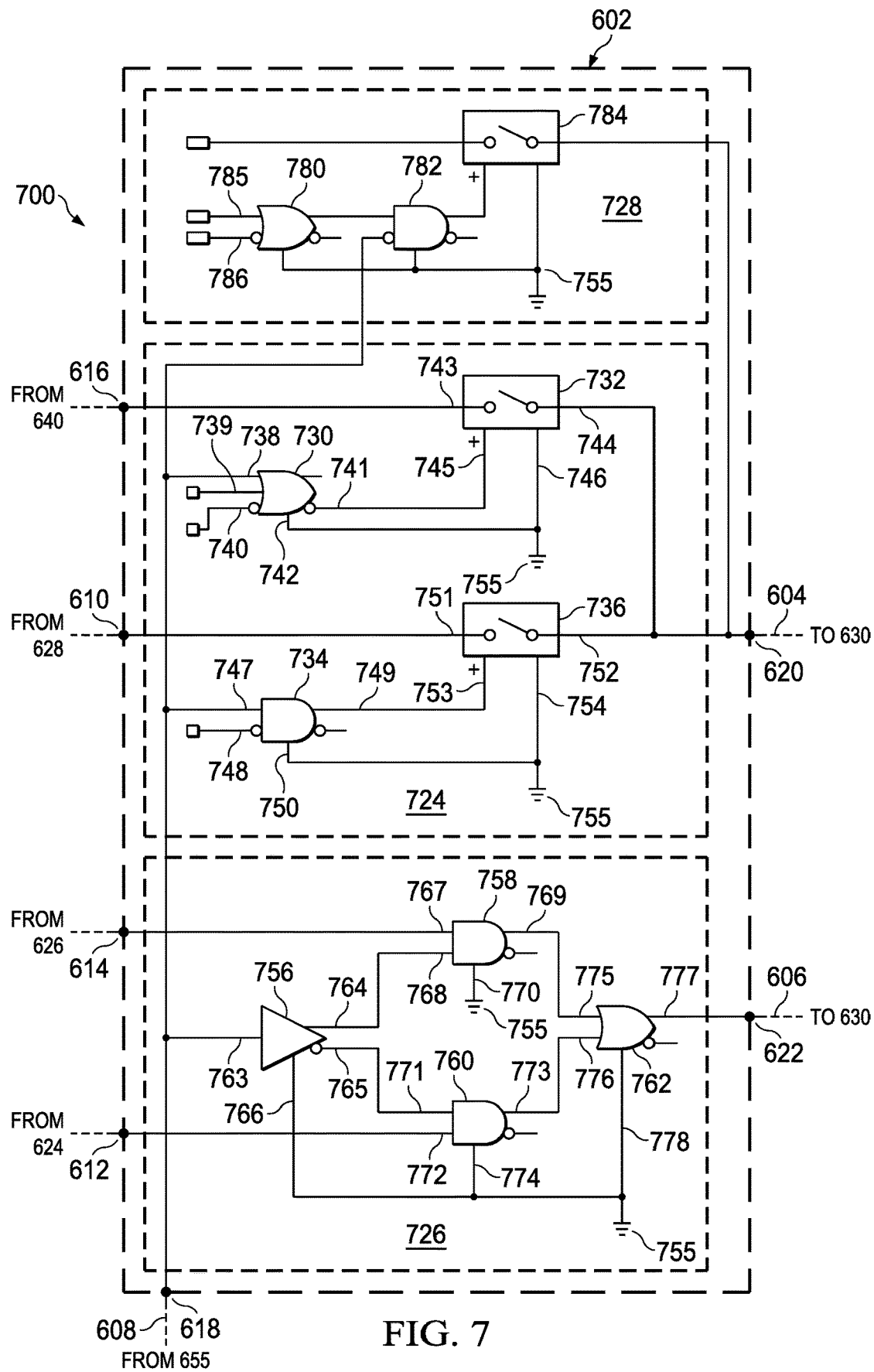
FIG. 7 is a diagram of an example schematic illustration of the selector of FIG. 6 configured to generate example control and trigger signals in response to an example select signal of FIG. 6.

FIG. 7 is a diagram of an example schematic illustration 700 of the selector 602 of FIG. 6 configured to generate the control and trigger signals (line 604, line 606, respectively) in response to an example select signal (line 608) of FIG. 6. In the example of FIG. 7, the selector 602 may be implemented by the selector 343 of FIGS. 3, 4, and/or 5. The selector 602 includes the first input terminal 610, the second input terminal 612, the third input terminal 614, the fourth input terminal 616, the fifth input terminal 618, the first output terminal 620, and the second output terminal 622 of FIG. 6. In FIG. 7, the first input terminal 610 is configured to be coupled to the feedback amplifier 628 of FIG. 6. The second input terminal 612 is configured to be coupled to the ramp generator 624 of FIG. 6. The third input terminal 614 is configured to be coupled to the oscillator 626 of FIG. 6. The fourth input terminal 616 is configured to be coupled to the phase controller 640 of FIG. 6. The fifth input terminal 618 is configured obtain the select signal (line 608) from the select controller 655. The first output terminal 620 is configured to be coupled to the PWM signal generator 630 of FIG. 6. The second output terminal 622 is configured to be coupled to the PWM signal generator 630 of FIG. 6.

In the example illustrated in FIG. 7, the selector 602 includes a control network 724, a trigger network 726, and a pulse-frequency modulation (PFM) mode network 728. The control network 724 is coupled to the first input terminal 610, to the fourth input terminal 616, to the fifth input terminal 618, and to the output terminal 620. The trigger network 726 is coupled to the third input terminal 614, the second input terminal 612, to the fifth input terminal 618, and to the second output terminal 622. In the example illustrated in FIG. 7, the control network 724 may correspond to the control switch 368 of FIGS. 3, 4, and/or 5. Likewise, the trigger network 726 may correspond to the trigger switch 370 of FIGS. 3, 4, and/or 5. The PFM mode network 728 is coupled to the fifth input terminal 618 and to the first output terminal 620.

In the example illustrated in FIG. 7, the control network 724 includes a first logic gate 730, a first switch 732, a second logic gate 734, and a second switch 736. In the topology illustrated in FIG. 7, the first logic gate 730 is an example complimentary XOR gate and the second logic gate 734 is an example complimentary AND gate. In other examples disclosed herein, any suitable combination of logic gates and/or circuit(s) may be used to implement the first logic gate 730 and/or the second logic gate 734. Likewise, the first switch 732 and the second switch 736 may be implemented by any suitable switching device (e.g., a metal-oxide-semiconductor field-effect transistor (MOSFET), bipolar junction transistor (BJT), a double pole single throw (DPST) switch, etc.). The first logic gate 730 includes a first input terminal 738, a second input terminal 739, a third input terminal 740, an output terminal 741, and a reference terminal 742. The first switch 732 includes an input terminal 743, an output terminal 744, a power terminal 745, and a reference terminal 746. The second logic gate 734 includes a first input terminal 747, a second input terminal 748, an output terminal 749, and a reference terminal 750. The second switch 736 includes an input terminal 751, an output terminal 752, a power terminal 753, and a reference terminal 754.

In the topology illustrated in FIG. 7, the first input terminal 738 of the first logic gate 730 is coupled to the fifth input terminal 618 of the selector 602. The second input terminal 739 of the first logic gate 730 is configured to obtain an example PFM signal (line 785). The third input terminal 740 of the first logic gate 730 is configured to obtain an example SSOK signal (line 786). The output terminal 741 of the first logic gate 730 is coupled to the power terminal 745 of the first switch 732. The reference terminal 742 of the first logic gate 730 is coupled to an example reference rail 755. With regard to the first switch 732, the input terminal 743 of the first switch 732 is coupled to the fourth input terminal 616 of the selector 602. The output terminal 744 of the first switch 732 is coupled to the first output terminal 620 of the selector 602. The reference terminal 746 of the first switch 732 is coupled to the reference rail 755.

In the topology illustrated in FIG. 7, the first input terminal 747 of the second logic gate 734 is coupled to the fifth input terminal 618 of the selector 602. The second input terminal 748 of the second logic gate 734 is configured to obtain the PFM signal (line 785). The output terminal 749 of the second logic gate 734 is coupled to the power terminal 753 of the second switch 736. The reference terminal 750 of the second logic gate 734 is coupled to the reference rail 755. With regard to the second switch 736, the input terminal 751 of the second switch 736 is coupled to the first input terminal 610 of the selector 602. The output terminal 752 of the second switch 736 is coupled to the first output terminal 620 of the selector 602. The reference terminal 754 of the second switch 736 is coupled to the reference rail 755.

In the example illustrated in FIG. 7, the control network 724 is configured to obtain the fixed frequency control voltage signal (e.g., $V_{CONTROL\_F}$) from the first input terminal 610, the constant-on-time control voltage signal (e.g., $V_{CONTROL\_C}$) from the fourth input terminal 616, and the select signal (line 608) from the fifth input terminal 618. In operation, the control network 724 is configured to produce and/or otherwise generate either the fixed frequency control voltage signal (e.g., $V_{CONTROL\_F}$) or the constant-on-time control voltage signal (e.g., $V_{CONTROL\_C}$) to be transmitted via the first output terminal 620 of the selector 602 in response to the select signal (line 608). For example, if the select signal (line 608) indicates to operate in constant-on-time mode (e.g., the select signal (line 608) is a logic low), then the control network 724 is configured to provide the constant-on-time control voltage signal (e.g., $V_{CONTROL\_C}$) to the first output terminal 620 of the selector 602. Alternatively, if the select signal (line 608) indicates to operate in fixed frequency mode (e.g., is a logic high), then the control network 724 is configured to provide the fixed frequency control voltage signal (e.g., $V_{CONTROL\_F}$) to the first output terminal 620 of the selector 602. In other examples disclosed herein, any suitable combination of logic gates and/or circuit(s) may be used to implement the control network 724. Additionally, in other examples disclosed herein, the select signal (line 608) may indicate to operate in constant-on-time mode when the select signal (line 608) is a logic high value. Likewise, in other examples disclosed herein, the select signal (line 608) may indicate to operate in fixed frequency mode when the select signal (line 608) is a logic low value. The select signal (line 608) indicates to operate in constant-on-time mode when the select signal (line 608) is a first logic value (e.g., a first state), and to operate in fixed frequency mode when the select signal (line 608) is a second logic value (e.g., a second state), the second logic value (e.g., second state) being different than the first logic value (e.g., first state).

In a further example operation, if the select signal (line 608) is a logic high value and the PFM signal (line 785) is a logic low value, then the second logic gate 734 will provide a logic high value to the power terminal 753 of the second switch 736. When a logic high value is provided to the power terminal 753 of the second switch 736, then the fixed frequency control signal (e.g., $V_{CONTROL\_F}$) is provided to the first output terminal 620 of the selector 602 (e.g., the select signal (line 608) indicates fixed frequency mode). Alternatively in such further example operation, if the select signal (line 608) is a logic low value, the PFM signal (line 785) is a logic low value, and the SSOK signal (line 786) is a logic high value, then the first logic gate 730 will provide a logic high value (e.g., via the inverted output terminal 741 of the first logic gate 730) to the power terminal 745 of the first switch 732. When a logic high value is provided to the power terminal 745 of the first switch 732, then the constant-on-time control signal (e.g., $V_{CONTROL\_C}$) is provided to the first output terminal 620 of the selector 602 (e.g., the select signal (line 608) indicates constant-on-time mode).

In the example illustrated in FIG. 7, the trigger network 726 includes a third logic gate 756, a fourth logic gate 758, a fifth logic gate 760, and a sixth logic gate 762. In the topology illustrated in FIG. 7, the third logic gate 756 is an example complimentary buffer, the fourth logic gate 758 is an example complimentary AND gate, the fifth logic gate 760 is an example complimentary AND gate, and the sixth logic gate 762 is an example complimentary XOR gate. In other examples disclosed herein, any suitable combination of logic gates and/or circuit(s) may be used to implement the third logic gate 756, the fourth logic gate 758, the fifth logic gate 760, and/or the sixth logic gate 762. The third logic gate 756 includes an input terminal 763, a first output terminal 764, a second output terminal 765, and a reference terminal 766. The fourth logic gate 758 includes a first input terminal 767, a second input terminal 768, an output terminal 769, and a reference terminal 770. The fifth logic gate 760 includes a first input terminal 771, a second input terminal 772, an output terminal 773, and a reference terminal 774. The sixth logic gate 762 includes a first input terminal 775, a second input terminal 776, an output terminal 777, and a reference terminal 778.

In the topology illustrated in FIG. 7, with regard to the third logic gate 756, the input terminal 763 of the third logic gate 756 is coupled to the fifth input terminal 618 of the selector 602. The first output terminal 764 of the third logic gate 756 is coupled to the second input terminal 768 of the fourth logic gate 758. The second output terminal 765 of the third logic gate 756 is coupled to the first input terminal 771 of the fifth logic gate 760. The reference terminal 766 of the third logic gate 756 is coupled to the reference rail 755.

With regard to the fourth logic gate 758, the first input terminal 767 of the fourth logic gate 758 is coupled to the third input terminal 614 of the selector 602. The second input terminal 768 of the fourth logic gate 758 is coupled to the first output terminal 764 of the third logic gate 756. The output terminal 769 of the fourth logic gate 758 is coupled to the first input terminal 775 of the sixth logic gate 762. The reference terminal 770 of the fourth logic gate 758 is coupled to the reference rail 755.

With regard to the fifth logic gate 760, the first input terminal 771 of the fifth logic gate 760 is coupled to the second output terminal 765 of the third logic gate 756. The second input terminal 772 of the fifth logic gate 760 is coupled to the second input terminal 612 of the selector 602. The output terminal 773 of the fifth logic gate 760 is coupled to the second input terminal 776 of the sixth logic gate 762. The reference terminal 774 of the fifth logic gate 760 is coupled to the reference rail 755.

With regard to the sixth logic gate 762, the first input terminal 775 of the sixth logic gate 762 is coupled to the output terminal 769 of the fourth logic gate 758. The second input terminal 776 of the sixth logic gate 762 is coupled to the output terminal 773 of the fifth logic gate 760. The output terminal 777 of the sixth logic gate 762 is coupled to the second output terminal 622 of the selector 602. The reference terminal 778 of the sixth logic gate 762 is coupled to the reference rail 755.

In the example illustrated in FIG. 7, the trigger network 726 is configured to obtain the fixed frequency trigger signal (e.g., $V_{TRIGGER\_F}$) from the third input terminal 614, the constant-on-time trigger signal (e.g., $V_{TRIGGER\_C}$) from the second input terminal 612, and the select signal (line 608) from the fifth input terminal 618. In operation, the trigger network 726 is configured to produce and/or otherwise generate either the fixed frequency trigger signal (e.g., $V_{TRIGGER\_F}$) or the constant-on-time trigger signal (e.g., $V_{TRIGGER\_C}$) to be transmitted via the second output terminal 622 of the selector 602 in response to the select signal (line 608). For example, if the select signal (line 608) indicates to operate in constant-on-time mode (e.g., the select signal (line 608) is a logic low), then the trigger network 726 is configured to provide the constant-on-time trigger signal (e.g., $V_{TRIGGER\_C}$) to the second output terminal 622 of the selector 602. Alternatively, if the select signal (line 608) indicates to operate in fixed frequency mode (e.g., is a logic high), then the trigger network 726 is configured to provide the fixed frequency trigger signal (e.g., $V_{TRIGGER\_F}$) to the second output terminal 622 of the selector 602. In other examples disclosed herein, any suitable combination of logic gates and/or circuit(s) may be used to implement the trigger network 726.

In a further example operation, if the select signal (line 608) is a logic high value then the third logic gate 734 provides a logic high value to the second input terminal 768 of the fourth logic gate 758 and a logic low value to the first input terminal 771 of the fifth logic gate 760. Therefore, the fourth logic gate 758 will provide the fixed frequency trigger signal (e.g., $V_{TRIGGER\_F}$) to the first input terminal 775 of the sixth logic gate 762. Alternatively, if the select signal (line 608) is a logic low value then the third logic gate 734 provides a logic low value to the second input terminal 768 of the fourth logic gate 758 and a logic high value to the first input terminal 771 of the fifth logic gate 760. Therefore, the fifth logic gate 760 will provide the constant-on-time trigger signal (e.g., $V_{TRIGGER\_C}$) to the second input terminal 776 of the sixth logic gate 762. Since the sixth logic gate 762 operates similar to a complimentary XOR gate, the sixth logic gate 762 provides either the fixed frequency trigger signal (e.g., $V_{TRIGGER\_F}$) or the constant-on-time trigger signal (e.g., $V_{TRIGGER\_C}$) to the second output terminal 622 of the selector 602 based on the select signal (line 608).

In the example illustrated in FIG. 7, the PFM mode network 728 includes a seventh logic gate 780, an eighth logic gate 782, and a third switch 784. The PFM mode network 728 is operable when the PFM signal (line 785) is a logic high. In examples disclosed herein, the PFM mode network 728 is configured to supply a PFM control voltage signal (e.g., $V_{CONTROL\_P}$) during power save operation. In other examples disclosed herein, any suitable number of logic gates and/or circuit(s) may be used to implement the PFM mode network 728.

In other examples disclosed herein, the selector 602 of the illustration 700, and more specifically, the control network 724, the trigger network 726, and the PFM mode network 728 may be located in physically different locations (e.g., distributed) within a suitable circuit, printed circuit board (PCB), and/or network of devices. For example, any of the first switch 732, the second switch 736, and/or the third switch 784 may be implemented and/or otherwise distributed utilizing a suitable switching device external to the selector 602.

Figure 8A:
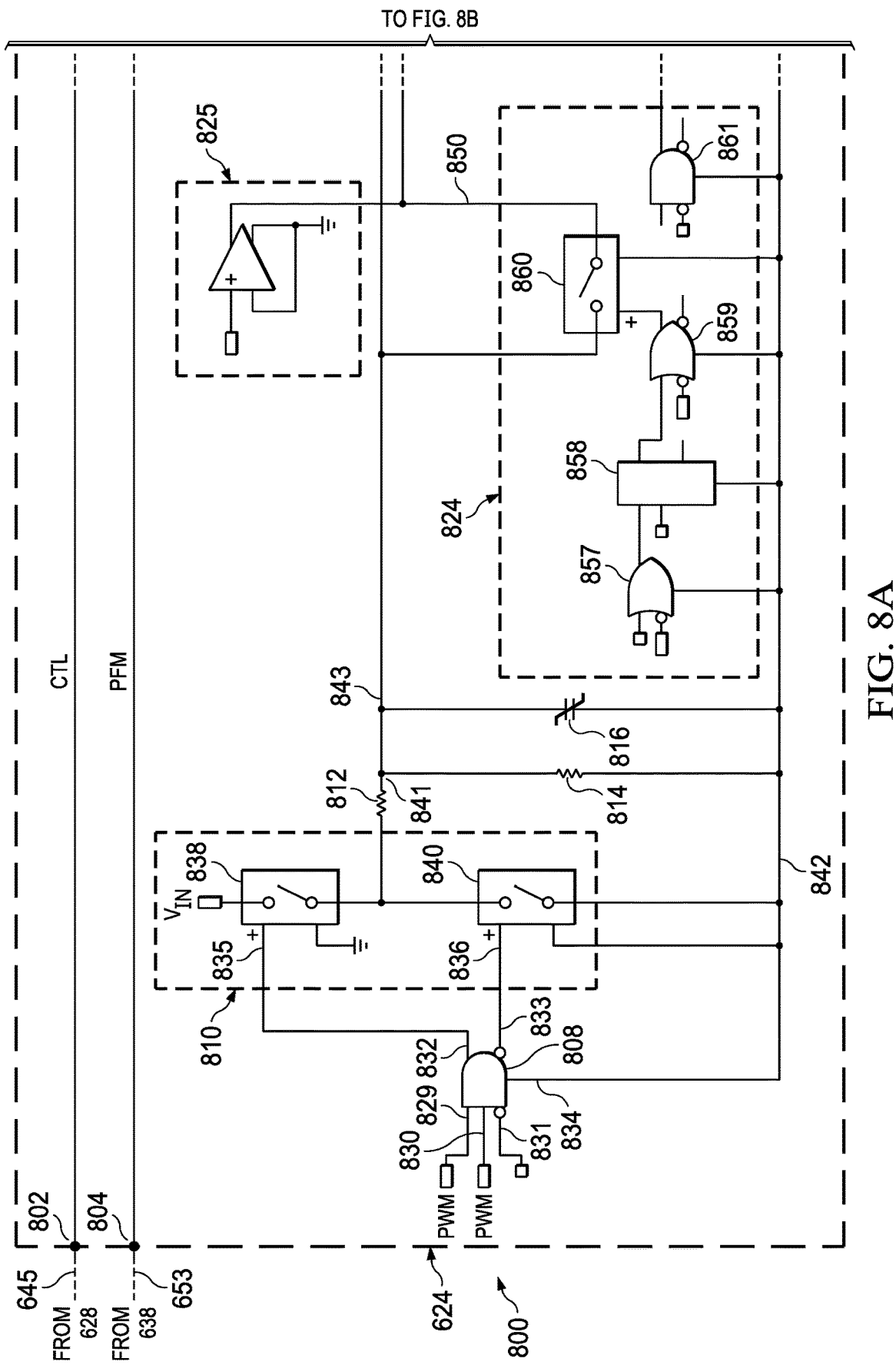
FIGS. 8A-8B, collectively
Figure 8B:
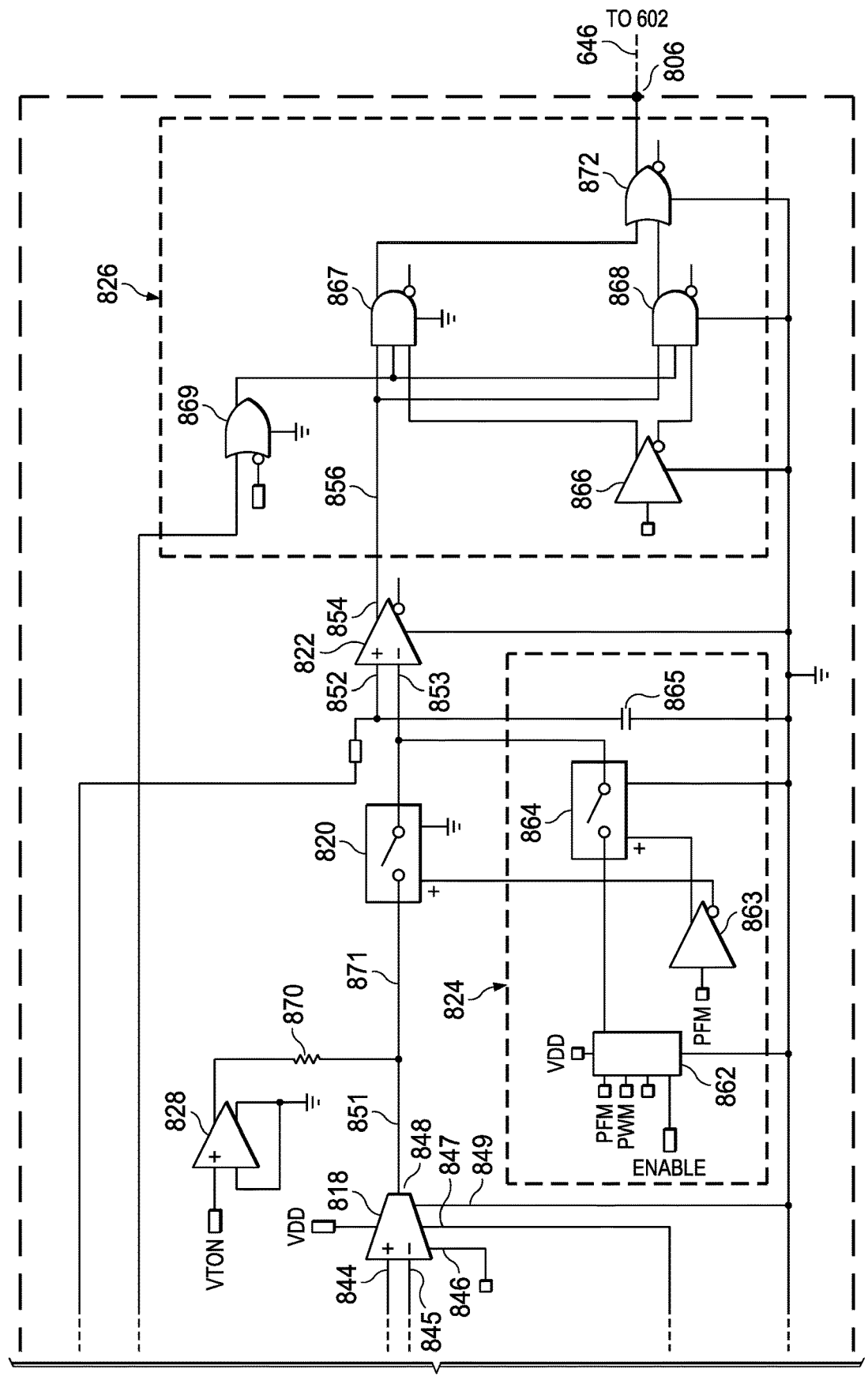

FIGS. 8A-8B, collectively FIG. 8, are an example schematic illustration 800 of the ramp generator 624 of FIG. 6. The ramp generator 624 of FIG. 6, as illustrated in FIG. 8, includes a first example input terminal 802, a second example input terminal 804, and an example output terminal 806. In other examples disclosed herein, the ramp generator 624 of FIG. 6, as illustrated in FIG. 8, may include any suitable number of input and/or output terminals. The ramp generator 624 of FIG. 6, as illustrated in FIG. 8, includes a first logic gate 808, an auxiliary half bridge network 810 (auxiliary H-bridge network 810), a first resistor 812, a second resistor 814, a capacitor 816, a transconductance amplifier 818, a first switch 820, a second comparator 822, a PFM mode network 824, and example offset network 825, a logic network 826, and a third comparator 828.

In the example illustrated in FIG. 8, the first logic gate 808 includes a first input terminal 829, a second input terminal 830, a third input terminal 831, a first output terminal 832, a second output terminal 833, and a reference terminal 834. The first input terminal 829 and the second input terminal 830 of the first logic gate 808 are configured to obtain an example PWM signal (PWM). The third input terminal 831 of the first logic gate 808 is configured to obtain an example control signal. The first output terminal 832 of the first logic gate 808 is coupled to an example second switch 838 of the auxiliary h-bridge network 810 and the second output terminal 833 of the first logic gate 808 is coupled to an example third switch 840 of the auxiliary h-bridge network 810. The reference terminal 834 of the first logic gate 808 is coupled to an example reference rail 842. The first logic gate 808 is configured to drive the auxiliary h-bridge network 810 via an example first PWM signal (line 835) and an example second PWM signal (line 836). In examples disclosed herein, the first PWM signal (line 835) and the second PWM signal (line 836) are complimentary signals. In addition, the first PWM signal (line 835) and the second PWM signal (line 836) are substantially similar (e.g., equal to, within a threshold, etc.), to the PWM signals that drive the first switch 312 and the second switch 314 of FIGS. 3, 4, and/or 5, respectively.

In the example illustrated in FIG. 8, the auxiliary h-bridge network 810 includes the second switch 838 and the third switch 840. The second switch 838 NMOS, and the third switch 840 may be a PMOS. In other examples, the second switch 838 and/or the third switch 840 are bipolar junction transistors (BJTs), junction gate field-effect transistors (JFETs), heterojunction bipolar transistors (HBTs), any suitable transistor for the application, and/or any combination thereof. The second switch 838 and the third switch 840 are physically small switches (e.g., smaller NMOS and/or PMOS) than the first switch 312 and the second switch 314 of FIGS. 3, 4, and/or 5. The second switch 838 and the third switch 840 are driven by the same PWM signals that drive the first switch 312 and the second switch 314, respectively.

In FIG. 8, the first resistor 812 is coupled to the auxiliary h-bridge network 810. In addition, the second resistor 814 is coupled to the first resistor 812 and to the reference rail 842. In such a topology, the first resistor 812 and the second resistor 814 are a resistive voltage divider coupled together at an example node 841. In operation, the first logic gate 808, the auxiliary h-bridge network 810, the first resistor 812, the second resistor 814, and the capacitor 816 operate in response to the same PWM signals provided to the first switch 312 and the second switch 314 of FIGS. 3, 4, and/or 5. As such, in operation, an example sawtooth signal (line 843) is generated that is level shifted by a direct current (DC) voltage value equivalent to the output voltage (e.g., $V_O$ of FIGS. 3, 4, and/or 5) divided by five volts. In other examples disclosed herein, the sawtooth signal (line 843) generated may be level shifted by any suitable DC voltage value (e.g., three volts, a DC voltage value equivalent to the output voltage ($V_O$) divided by two, etc.).

In the example illustrated in FIG. 8, the transconductance amplifier 818 is coupled to the node 841, the first switch 820, the PFM mode network 824, the third comparator 828, the reference rail 842, and to an example biasing resistor 870. The transconductance amplifier 818 includes a first input terminal 844, a second input terminal 845, a third input terminal 846, an enable terminal 847, an output terminal 848, and a reference terminal 849. In FIG. 8, the first input terminal 844 of the transconductance amplifier 818 is coupled to the node 841, the second input terminal 845 of the transconductance amplifier 818 is coupled to the offset network 825, the third input terminal 846 of the transconductance amplifier 818 is configured to obtain an example control signal, the enable terminal 847 of the transconductance amplifier 818 is coupled to the PFM mode network 824, the output terminal 848 of the transconductance amplifier 818 is coupled to the first switch 820 and to the biasing resistor 870, and the reference terminal 849 of the transconductance amplifier 818 is coupled to the reference rail 842.

In operation, the transconductance amplifier 818 is configured to obtain an example offset signal (line 850) from the offset network 825. In examples disclosed herein, the offset signal (line 850) is an example DC voltage signal that is equivalent to the output voltage (e.g., $V_O$ of FIGS. 3, 4, and/or 5) divided by five. In other examples disclosed herein, the offset signal (line 850) may be equivalent to any suitable DC voltage value (e.g., three volts, a DC voltage value equivalent to the output voltage ($V_O$) divided by two, etc.). In FIG. 8, the offset signal (line 850) is equivalent to the level shift of the sawtooth signal (line 843). The transconductance amplifier 818 operates as an offset subtractor by subtracting the offset signal (line 850) from the sawtooth signal (line 843). Therefore, the transconductance amplifier 818 is operable to produce an example modified sawtooth signal (line 851). The modified sawtooth signal (line 851) is therefore independent of the output voltage level (e.g., $V_O$) of a coupled power stage (e.g., the power stage 302 of FIGS. 3, 4, and/or 5). In addition, the modified sawtooth signal (line 851) is further biased across the biasing resistor 870 in order to remove any variations to the saw-tooth signal due to any output voltage of a coupled power stage. In an example operation, because the offset signal (line 850) corresponds to an average voltage signal, and the sawtooth signal (line 843) and/or the modified sawtooth signal (line 851) include peak-to-peak components, the biasing resistor is configured to ensure the modified sawtooth signal (line 851) does not fall to a lower peak voltage less than zero volts. Such a resulting signal across the biasing resistor 870 is an example biased sawtooth signal (line 871). In some examples disclosed herein, the biased sawtooth signal (line 871) may be a voltage and/or current signal substantially (e.g., within a threshold voltage level and/or current amount) to the modified sawtooth signal (line 851). In other examples disclosed herein, the transconductance amplifier 818 may be configured to perform the function of the biasing resistor 870.

In examples disclosed herein, the third comparator 828 is a buffer configured to isolate an offset voltage (e.g., $V_{TON}$, the offset voltage (line 850)) from the sawtooth signal (line 843), the modified sawtooth signal (line 851), and/or the biased sawtooth signal (line 871). In this topology, the third comparator 828 ensures noise does not reflect into noise sensitive circuits.

In the example illustrated in FIG. 8, the second comparator 822 includes a first input terminal 852, a second input terminal 853, an output terminal 854, and a reference terminal 855. The first input terminal 852 of the second comparator 822 is coupled to the first input terminal 802 of the ramp generator 624, the second input terminal 853 of the second comparator 822 is coupled to the output terminal 848 of the transconductance amplifier 818 via the first switch 820, the output terminal 854 of the second comparator 822 is coupled to the logic network 826, and the reference terminal 855 of the second comparator 822 is coupled to the reference rail 842. The second comparator 822 is configured to determine whether the biased sawtooth signal (line 871) intersects with the first example control signal (line 645). For example, the second comparator 822 may determine whether the biased sawtooth signal (line 871) is less than or equal to the first example control signal (line 645). In such an example, the second comparator 822 generates an example trigger signal (line 856). The trigger signal (line 856) is utilized by the logic network 826 to generate the constant-on-time trigger signal (line 646) (e.g., $V_{TRIGGER\_C}$ of FIGS. 3, 4, and/or 5) for use by the selector 602. In some examples disclosed herein, the second comparator 822 may be implemented as the comparator 336 of FIGS. 3, 4, and/or 5. Likewise, in some examples disclosed herein, the trigger signal (line 856) may be implemented as the constant-on-time trigger signal $V_{TRIGGER\_C}$ at the output terminal 366 of the comparator 336 of FIGS. 3, 4, and/or 5. In such an example implementation, the logic network 826 may be implemented to filter noise spikes and, as such, the constant-on-time trigger signal (line 646) (e.g., $V_{TRIGGER\_C}$ of FIGS. 3, 4, and/or 5) illustrated in FIG. 8 is substantially similar to the trigger signal (line 856).

In the example illustrated in FIG. 8, the PFM mode network 824 includes a plurality of electrical components such as logic gates, operational amplifiers, resistors, capacitors, integrated chips, etc. For example, the PFM mode network 824 includes a second logic gate 857, a latch 858, a third logic gate 859, a fourth switch 860, a fourth logic gate 861, an integrated chip 862, a buffer 863, a fifth switch 864, and a capacitor 865. The PFM mode network 824 may be configured to operate in a similar manner as the PFM mode network 728 of FIG. 7 inside the selector 602. In operation, the PFM mode network 824 is configured to supply a PFM control voltage signal during power save operation. In other examples disclosed herein, any suitable number of logic gates and/or circuit(s) may be used to implement the PFM mode network 824.

In the example illustrated in FIG. 8, the logic network 826 includes a fifth logic gate 866, a sixth logic gate 867, a seventh logic gate 868, an eighth logic gate 869, and a ninth logic gate 872. In the example of FIG. 8, the fifth logic gate 866 is an example complementary buffer, the sixth logic gate 867 is an example complementary AND gate, the seventh logic gate 868 is an example complementary AND gate, the eighth logic gate 869 is an example complementary XOR gate, and the ninth logic gate 872 is an example complementary XOR gate. The logic network 826 is configured to transmit the constant-on-time trigger signal (line 646) (e.g., $V_{TRIGGER\_C}$ of FIGS. 3, 4, and/or 5) for use by the selector 602 during constant-on-time mode operation. In other examples disclosed herein, any suitable number of electronic devices (e.g., logic gates, resistors, transistors, etc.), may be used to transmit the constant-on-time trigger signal (line 646) (e.g., $V_{TRIGGER\_C}$ of FIGS. 3, 4, and/or 5) for use by the selector 602 during constant-on-time mode operation.

Figure 9:
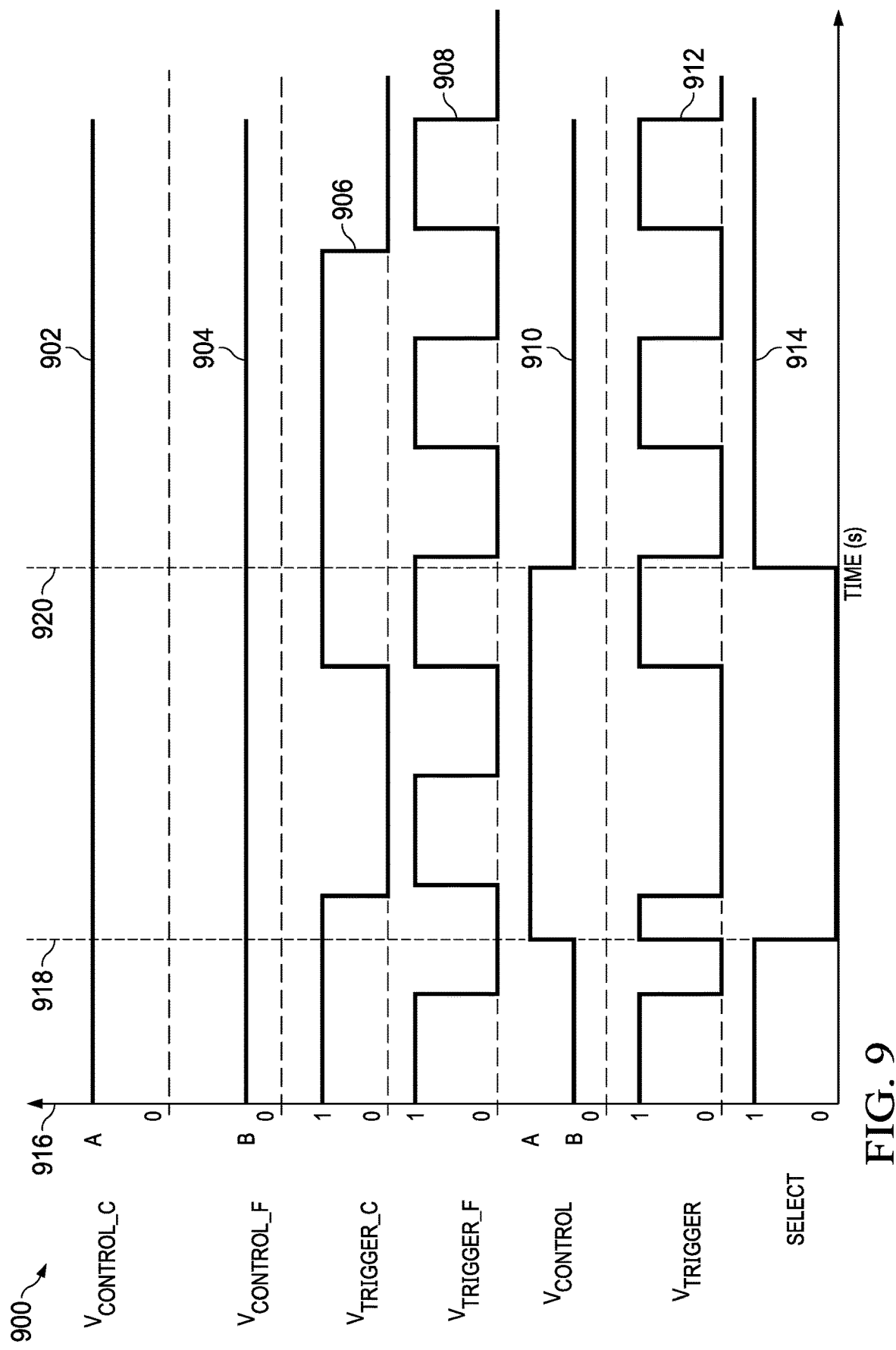
FIG. 9 is an example signal plot illustrating various signals of the selector of FIGS. 3, 4, and/or 6, and/or the selector of FIGS. 6, 7, and/or 8.

FIG. 9 is an example signal plot 900 illustrating various signals of the selector 343 of FIGS. 3, 4, and/or 6, and/or the selector 602 of FIGS. 6, 7, and/or 8. The plot 900 of FIG. 9 includes a constant-on-time control signal (line 902), a fixed frequency control signal (line 904), a constant-on-time trigger signal (line 906), a fixed frequency trigger signal (line 908), a control signal (line 910), a trigger signal (line 912), and a select signal (line 914). In FIG. 9, the constant-on-time control signal (line 902) may represent the constant-on-time control signal ($V_{CONTROL\_C}$) of FIGS. 3, 4, and/or 5, and/or the constant-on-time control signal (line 654) of FIGS. 6, 7, and/or 8. The fixed frequency control signal (line 904) may represent the fixed frequency control signal ($V_{CONTROL\_F}$) of FIGS. 3, 4, and/or 5, and/or the fixed frequency control signal (line 650) of FIGS. 6, 7, and/or 8. The constant-on-time trigger signal (line 906) may represent the constant-on-time trigger signal ($V_{TRIGGER\_C}$) of FIGS. 3, 4, and/or 5, and/or the constant-on-time trigger signal (line 646) of FIGS. 6, 7, and/or 8. The fixed frequency trigger signal (line 908) may represent the fixed frequency trigger signal ($V_{TRIGGER\_F}$) of FIGS. 3, 4, and/or 5, and/or the fixed frequency trigger signal (line 647) of FIGS. 6, 7, and/or 8. The control signal (line 910) may represent the control signal generated at the output terminal 376 of the control switch 368 of FIGS. 3, 4, and/or 5, and/or the control signal (line 604) of FIGS. 6, 7, and/or 8. The trigger signal (line 912) may represent the trigger signal generated at the output terminal 382 of the trigger switch 370 of FIGS. 3, 4, and/or 5, and/or the trigger signal (line 606) of FIGS. 6, 7, and/or 8. The select signal (line 914) of FIG. 9 may represent the select signal (line 386) of FIGS. 3, 4, and/or 5, and/or the select signal (line 608) of FIGS. 6, 7, and/or 8.

In FIG. 9, between an example first time 916 and an example second time 918, the select signal (line 914) is a logic high value. In examples disclosed herein, when the select signal (line 914) is a logic high value, fixed frequency mode is to be enabled. As such, between the first time 916 and the second time 918, the control signal (line 910) and the trigger signal (line 912) are implemented as the fixed frequency control signal (line 904) and the fixed frequency trigger signal (line 908), respectively.

Between the second time 918 and an example third time 920, the select signal (line 914) is a logic low value. In examples disclosed herein, when the select signal (line 914) is a logic low value, constant-on-time mode is to be enabled. As such, between the second time 918 and the third time 920, the control signal (line 910) and the trigger signal (line 912) are implemented as the constant-on-time control signal (line 902) and the constant-on-time trigger signal (line 906), respectively.

After the third time 920, the select signal (line 914) is a logic high value. As such, the control signal (line 910) and the trigger signal (line 912) are implemented as the fixed frequency control signal (line 904) and the fixed frequency trigger signal (line 908), respectively.

In other examples disclosed herein, the select signal (line 914) may implement constant-on-time mode during a logic high and implement fixed frequency mode during a logic low. In other examples disclosed herein, any of the constant-on-time control signal (line 902), the fixed frequency control signal (line 904), the constant-on-time trigger signal (line 906), the fixed frequency trigger signal (line 908), the control signal (line 910), the trigger signal (line 912), and/or the select signal (line 914) may be any suitable voltage value.

Figure 10:
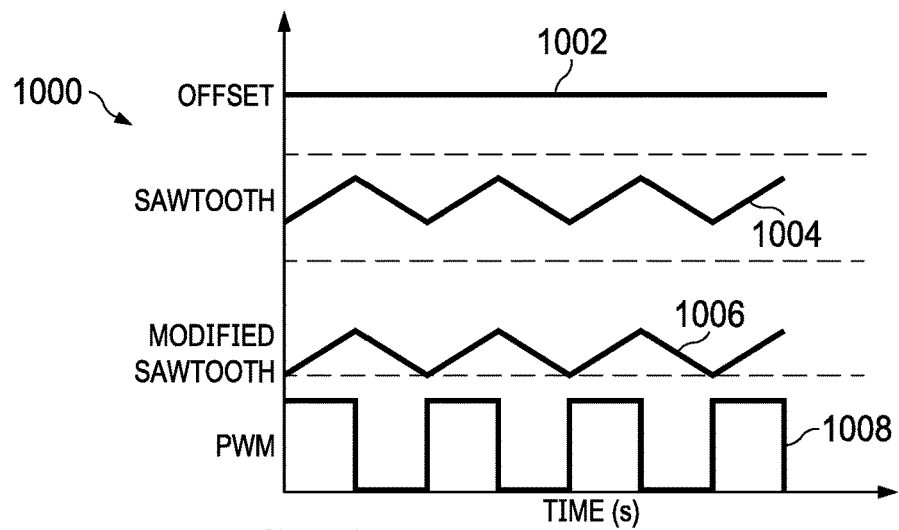
FIG. 10 is an example signal plot illustrating various signals of the ramp generator of FIGS. 6, 7, and/or 8.

FIG. 10 is an example signal plot 1000 illustrating various signals of the ramp generator 624 of FIGS. 6, 7, and/or 8. The signal plot 1000 of FIG. 10 includes an offset signal (line 1002), a sawtooth signal (line 1004), a modified sawtooth signal (line 1006), and a PWM signal (line 1008). In FIG. 10, the offset signal (line 1002) may represent the offset signal (line 850) of FIG. 8, the sawtooth signal (line 1004) may represent the sawtooth signal (line 843) of FIG. 8, the modified sawtooth signal (line 1006) may represent the modified sawtooth signal (line 851) of FIG. 8, and the PWM signal (line 1008) may represent the PWM signal provided at the output terminal 328 of the PWM signal generator 304 of FIG. 3, the PWM signal provided at the output terminal 424 of the analog, ramp-based PWM signal generator 402 of FIG. 4, the PWM signal provided at the output terminal 544 of the DPWM signal generator 502 of FIG. 5, and/or the PWM signal (line 651) of FIGS. 6, 7, and/or 8.

In FIG. 10, the modified sawtooth signal (line 1006) represents the sawtooth signal (line 1004) independent of the output voltage (e.g., $V_O$ of FIGS. 3, 4, and/or 5). As such, the offset signal (line 1002) is subtracted from the sawtooth signal (line 1004). In examples disclosed herein, sawtooth signal (line 1004) is shifted up by a voltage value proportional to the output voltage (e.g., $V_O$ of FIGS. 3, 4, and/or 5). In addition, the offset signal (line 1002) represents a voltage signal equivalent to the same output voltage proportions that the sawtooth signal (line 1004) is shifted by. In examples disclosed herein, the magnitude of the offset signal (line 1002) may be any suitable voltage value and, as such, the magnitude of shift of the sawtooth signal (line 1004) may be any suitable voltage value.

While an example manner of implementing the PWM signal controller 306 of FIG. 3 and/or the power conversion system 600 of FIG. 6 is illustrated in FIGS. 3, 4, 5, 6, 7, and/or 8 one or more of the elements, processes and/or devices illustrated in FIGS. 3, 4, 5, 6, 7, and/or 8 may be combined, divided, re-arranged, omitted, eliminated and/or implemented in any other way. Further, the example amplifying network 330, the example reference voltage generator 332, the example compensator 334, the example comparator 336, the example fixed voltage regulator 338, the example oscillator 340, the example selector 343, the example select controller 384, the example PWM signal generator 304, the example drive logic network 308, the example power stage 302, the example analog, ramp-based PWM signal generator 402 of FIG. 4, the example DPWM signal generator 502 of FIG. 5, and/or, more generally, the example PWM signal controller 306 of FIGS. 3, 4, and/or 5, the example selector 602, the example ramp generator 624, the example oscillator 626, the example feedback amplifier 628, the example PWM signal generator 630, the example soft-start controller 632, the example biasing network 634, the example fault protection network 636, the example PFM control network 638, the example phase controller 640, the example feed forward voltage controller 642, the example power converter interface 644, the example select controller 655, the example control network 724, the example trigger network 726, the example PFM mode network 728, the example first logic gate 808, the example auxiliary H-bridge network 810, the example first resistor 812, the example second resistor 814, the example capacitor 816, the example transconductance amplifier 818, the example first switch 820, the example second comparator 822, the example PFM mode network 824, the example offset network 825, the example logic network 826, the an example third comparator 828, and/or, more generally, the example power conversion system 600 of FIGS. 6, 7, and/or 8 may be implemented by hardware, software, firmware and/or any combination of hardware, software and/or firmware. Thus, for example, any of the example amplifying network 330, the example reference voltage generator 332, the example compensator 334, the example comparator 336, the example fixed voltage regulator 338, the example oscillator 340, the example selector 343, the example select controller 384, the example PWM signal generator 304, the example drive logic network 308, the example power stage 302, the example analog, ramp-based PWM signal generator 402 of FIG. 4, the example DPWM signal generator 502 of FIG. 5, and/or, more generally, the example PWM signal controller 306 of FIGS. 3, 4, and/or 5, the example selector 602, the example ramp generator 624, the example oscillator 626, the example feedback amplifier 628, the example PWM signal generator 630, the example soft-start controller 632, the example biasing network 634, the example fault protection network 636, the example PFM control network 638, the example phase controller 640, the example feed forward voltage controller 642, the example power converter interface 644, the example select controller 655, the example control network 724, the example trigger network 726, the example PFM mode network 728, the example first logic gate 808, the example auxiliary H-bridge network 810, the example first resistor 812, the example second resistor 814, the example capacitor 816, the example transconductance amplifier 818, the example first switch 820, the example second comparator 822, the example PFM mode network 824, the example offset network 825, the example logic network 826, the an example third comparator 828, and/or, more generally, the example power conversion system 600 of FIGS. 6, 7, and/or 8 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example amplifying network 330, the example reference voltage generator 332, the example compensator 334, the example comparator 336, the example fixed voltage regulator 338, the example oscillator 340, the example selector 343, the example select controller 384, the example PWM signal generator 304, the example drive logic network 308, the example power stage 302, the example analog, ramp-based PWM signal generator 402 of FIG. 4, the example DPWM signal generator 502 of FIG. 5, and/or, more generally, the example PWM signal controller 306 of FIGS. 3, 4, and/or 5, the example selector 602, the example ramp generator 624, the example oscillator 626, the example feedback amplifier 628, the example PWM signal generator 630, the example soft-start controller 632, the example biasing network 634, the example fault protection network 636, the example PFM control network 638, the example phase controller 640, the example feed forward voltage controller 642, the example power converter interface 644, the example select controller 655, the example control network 724, the example trigger network 726, the example PFM mode network 728, the example first logic gate 808, the example auxiliary H-bridge network 810, the example first resistor 812, the example second resistor 814, the example capacitor 816, the example transconductance amplifier 818, the example first switch 820, the example second comparator 822, the example PFM mode network 824, the example offset network 825, the example logic network 826, the an example third comparator 828, and/or, more generally, the example power conversion system 600 of FIGS. 6, 7, and/or 8 is/are hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., including the software and/or firmware. Further still, the example PWM signal controller 306 and/or the example power conversion system 600 of FIGS. 3, 4, 5, 6, 7, and/or 8 may include one or more elements, processes and/or devices in addition to, or instead of, those illustrated in FIG. 4, and/or may include more than one of any or all of the illustrated elements, processes and devices. As used herein, the phrase in communication, including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
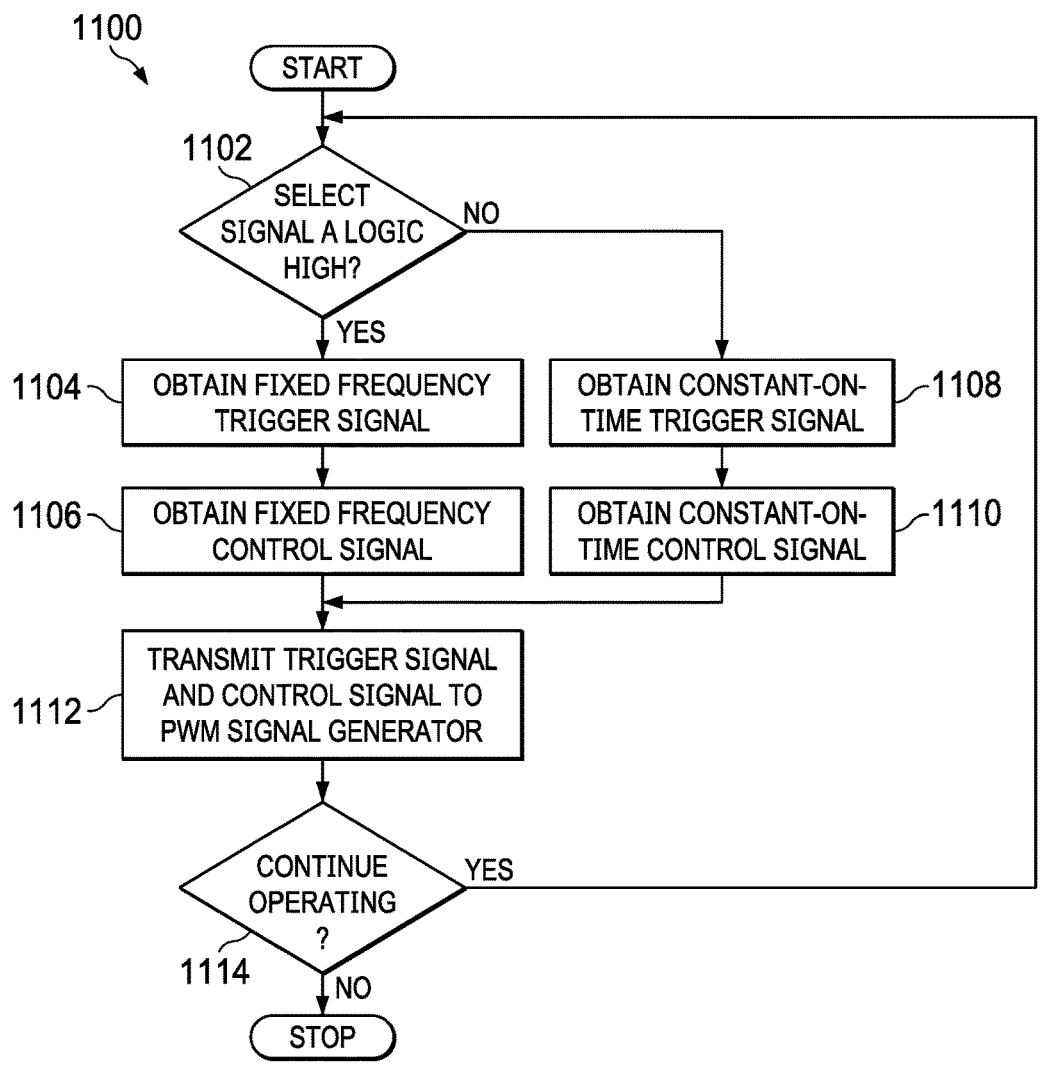
FIG. 11 is a flowchart representative of a process that may be implemented using logic or machine readable instructions that may be executed to implement the selector of FIGS. 3, 4, and/or 5 and/or the selector of FIGS. 6, 7, and/or 8.

Flowcharts representative of example hardware logic, machine readable instructions, hardware implemented state machines, and/or any combination thereof for implementing the PWM signal controller 306 and/or the power conversion system 600 of FIGS. 3, 4, 5, 6, 7, and/or 8 is shown in FIGS. 11 and/or 12. The machine readable instructions may be an executable program or portion of an executable program for execution by one or more computer processors, one or more microcontrollers, etc. For example, the machine readable instructions may be executed by one or more integrated circuits, logic circuits, microprocessors, GPUs, DSPs, or controllers from any desired family or manufacturer. For example, the one or more integrated circuits, logic circuits, microprocessors, GPUs, DSPs, or controllers may be semiconductor based (e.g., silicon based) device(s). The program may be embodied in software stored on a non-transitory computer readable storage medium such as non-volatile memory, volatile memory, etc., associated with the one or more computer processors, the one or more microcontrollers, etc., but the entire program and/or parts thereof could alternatively be executed by a device other than the one or more computer processors, the one or more microcontrollers, etc., and/or embodied in firmware or dedicated hardware. Further, although the example program is described with reference to the flowcharts illustrated in FIGS. 11 and/or 12, many other methods of implementing the example PWM signal controller 306 and/or the power conversion system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11 and/or 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Including and comprising (and all forms and tenses thereof) are used herein to be open ended terms. Thus, whenever a claim employs any form of include or comprise (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase, at least, is used as the transition term in, for example, a preamble of a claim, it is open-ended in the same manner as the term comprising and including are open ended. The term, and/or, when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase, at least one of A and B, is intended to refer to implementations including any of (1) at least one A, (2) at least one B, and (3) at least one A and at least one B. Similarly, as used herein in the context of describing structures, components, items, objects and/or things, the phrase, at least one of A or B, is intended to refer to implementations including any of (1) at least one A, (2) at least one B, and (3) at least one A and at least one B. As used herein in the context of describing the performance or execution of processes, instructions, actions, activities and/or steps, the phrase, at least one of A and B, is intended to refer to implementations including any of (1) at least one A, (2) at least one B, and (3) at least one A and at least one B. Similarly, as used herein in the context of describing the performance or execution of processes, instructions, actions, activities and/or steps, the phrase, at least one of A or B, is intended to refer to implementations including any of (1) at least one A, (2) at least one B, and (3) at least one A and at least one B.

As used herein, singular references (e.g., a, an, first, second, etc.) do not exclude a plurality. The term a or an entity, as used herein, refers to one or more of that entity. The terms a (or an), one or more, and at least one can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 11 is a flowchart representative of a process 1100 that may be implemented using logic or machine readable instructions that may be executed to implement the selector 343 of FIGS. 3, 4, and/or 5 and/or the selector 602 of FIGS. 6, 7, and/or 8. In the example process 1100 of FIG. 11, the selector 343 and/or the selector 602 determines whether an example select signal (e.g., the select signal (line 386) and/or the select signal (line 608)) is a logic high value. (Block 1102). In response to determining the select signal (e.g., the select signal (line 386) and/or the select signal (line 608)) is a logic high value (e.g., the control of block 1102 returns a result of YES), the selector 343 and/or the selector 602 obtains an example fixed frequency trigger signal (e.g., $V_{TRIGGER\_F}$ of FIGS. 3, 4, and/or 5, and/or the fixed frequency trigger signal (line 647) of FIGS. 6, 7, and/or 8). (Block 1104). In addition, the selector 343 and/or the selector 602 obtains an example fixed frequency control signal (e.g., $V_{CONTROL\_F}$ of FIGS. 3, 4, and/or 5, and/or the fixed frequency control signal (line 650) of FIGS. 6, 7, and/or 8). (Block 1106).

Alternatively, if the selector 343 and/or the selector 602 determines the select signal (e.g., the select signal (line 386) and/or the select signal (line 608)) is not a logic high (e.g., the control of block 1102 returns a result of NO), the selector 343 and/or the selector 602 obtains an example constant-on-time trigger signal (e.g., $V_{TRIGGER\_C}$ of FIGS. 3, 4, and/or 5, and/or the constant-on-time trigger signal (line 646) of FIGS. 6, 7, and/or 8). (Block 1108). In addition, the selector 343 and/or the selector 602 obtains an example constant-on-time control signal (e.g., $V_{CONTROL\_C}$ of FIGS. 3, 4, and/or 5, and/or the constant-on-time control signal (line 654) of FIGS. 6, 7, and/or 8). (Block 1110).

In other examples disclosed herein, the select signal (e.g., the select signal (line 386) and/or the select signal (line 608)) may indicate to operate in constant-on-time mode when the select signal (e.g., the select signal (line 386) and/or the select signal (line 608)) is a logic high value. Likewise, in other examples disclosed herein, the select signal (e.g., the select signal (line 386) and/or the select signal (line 608)) may indicate to operate in fixed frequency mode when the select signal (e.g., the select signal (line 386) and/or the select signal (line 608)) is a logic low value. In such examples disclosed herein, control may proceed to block 1108 in response to the selector 343 and/or the selector 602 determining the select signal (e.g., the select signal (line 386) and/or the select signal (line 608)) is a logic high value. Likewise, in such examples disclosed herein, control may proceed to block 1104 in response to the selector 343 and/or the selector 602 determining the select signal (e.g., the select signal (line 386) and/or the select signal (line 608)) is not a logic high value.

The selector 343 and/or the selector 602 transmits the obtained trigger signal obtained in either block 1104 or block 1108 and the obtained control signal obtained in either block 1106 or block 1110 to an example PWM signal generator (e.g., the PWM signal generator 304 of FIG. 3, the analog, ramp-based PWM signal generator 402 of FIG. 4, the DPWM signal generator 502 of FIG. 5, and/or the PWM signal generator 630 FIGS. 6, 7, and/or 8). (Block 1112). In response, the selector 343 and/or the selector 602 determine whether to continue operating. (Block 1114). If the selector 343 and/or the selector 602 determine to continue operating (e.g., the control of block 1114 returns a result of YES), control proceeds to block 1102. Alternatively, if the selector 343 and/or the selector 602 determine not to continue operating (e.g., the control of block 1114 returns a result of NO), the process 1100 stops.

Figure 12:
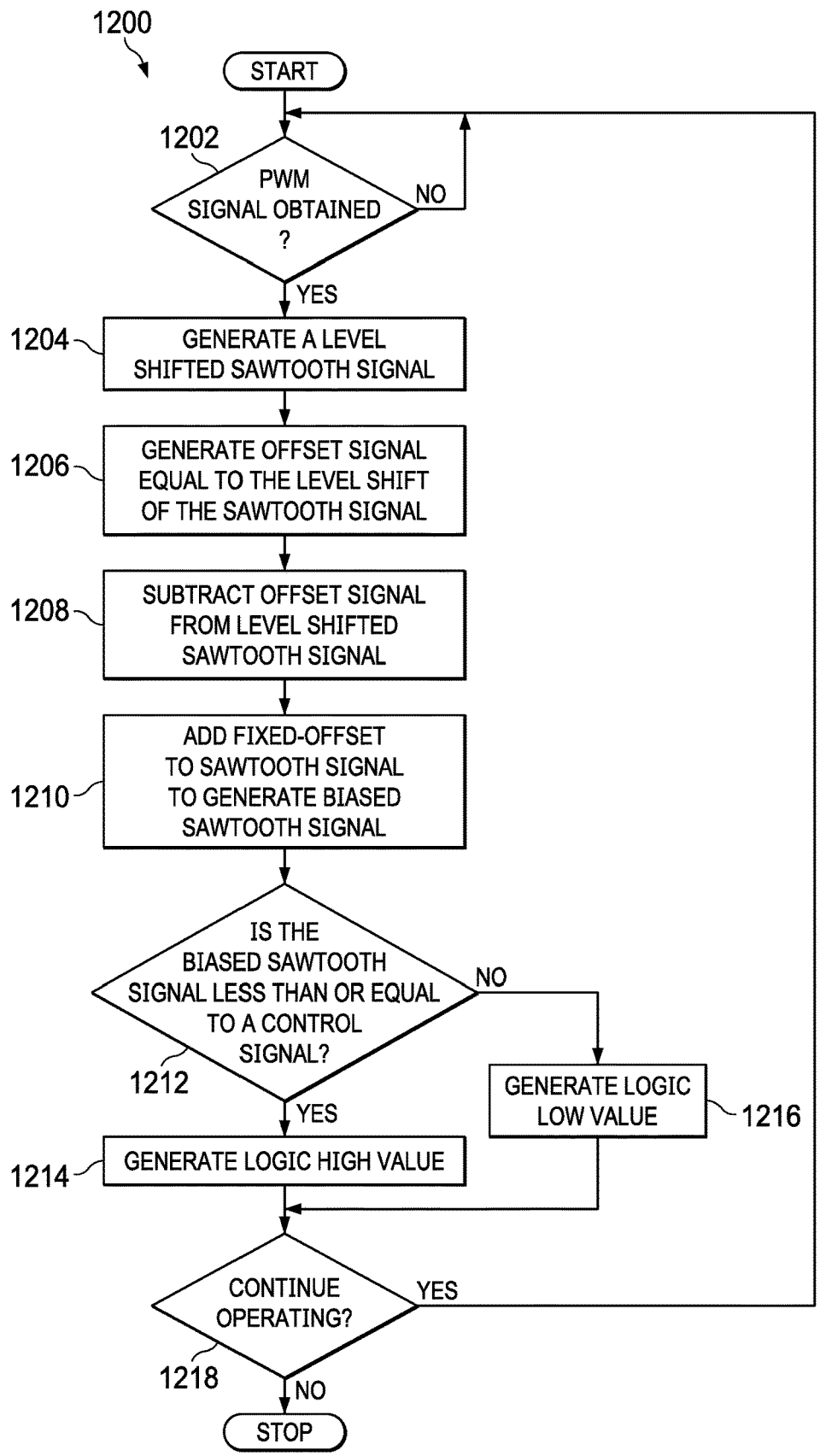
FIG. 12 is a flowchart representative of a process that may be implemented using logic or machine readable instructions that may be executed to implement the ramp generator of FIGS. 6, 7, and/or 8.

FIG. 12 is a flowchart representative of a process 1200 that may be implemented using logic or machine readable instructions that may be executed to implement the ramp generator 624 of FIGS. 6, 7, and/or 8. In FIG. 12, the first logic gate 808 of FIG. 8 determines whether an example PWM signal (e.g., the PWM signal sent to the drive logic network 308 of FIGS. 3, 4, and/or 5) is obtained. (Block 1202). If the first logic gate 808 does not determine that the PWM signal (e.g., the PWM signal sent to the drive logic network 308 of FIGS. 3, 4, and/or 5) is obtained (e.g., the control of block 1202 returns a result of NO), control continues to wait. Alternatively, if the first logic gate 808 determines that the PWM signal (e.g., the PWM signal sent to the drive logic network 308 of FIGS. 3, 4, and/or 5) is obtained (e.g., the control of block 1202 returns a result of YES), the h-bridge network 810 of FIG. 8 generates a level shifted sawtooth signal (e.g., the sawtooth signal (line 843) of FIG. 8). (Block 1204). In addition, the offset network 825 of FIG. 8 generates an example offset signal (e.g., the offset signal (line 850)). (Block 1206). The control of blocks 1204 and 1206 may be executed in parallel.

In response, the transconductance amplifier 818 of FIG. 8 subtracts the offset signal (e.g., the offset signal (line 850)) from the level shifted sawtooth signal (e.g., the sawtooth signal (line 843) of FIG. 8) to generate an example modified sawtooth signal (e.g., the modified sawtooth signal (line 851) of FIG. 8). (Block 1208). In addition, an example fixed-offset voltage is added to the modified sawtooth signal (e.g., the modified sawtooth signal (line 851)) by the biasing resistor 870 at the output terminal 848 of the transconductance amplifier 818. (Block 1210). For example, the modified sawtooth signal (line 851) is biased across the biasing resistor 870 to a fixed value. The second comparator 822 of FIG. 8 determines whether the biased sawtooth signal (e.g., the biased sawtooth signal (line 871)) is less than or equal to an example control signal (e.g., the control signal (line 645) of FIGS. 6, 7, and/or 8). (Block 1212). If the second comparator 822 of FIG. 8 determines that the biased sawtooth signal (e.g., the example biased sawtooth signal (line 871)) is less than or equal to an example control signal (e.g., the control signal (line 645) of FIGS. 6, 7, and/or 8) (e.g., the control of block 1212 returns a result of YES), the logic network 826 of FIG. 8 generates an example constant-on-time trigger signal (e.g., the constant-on-time trigger signal (line 646) of FIGS. 6, 7, and/or 8) as a logic high signal. (Block 1214). Alternatively, if the second comparator 822 of FIG. 8 determines that the biased sawtooth signal (e.g., the biased sawtooth signal (line 871)) is not less than or equal to an example control signal (e.g., the control signal (line 645) of FIGS. 6, 7, and/or 8) (e.g., the control of block 1212 returns a result of NO), the logic network 826 of FIG. 8 generates an example constant-on-time trigger signal (e.g., the constant-on-time trigger signal (line 646) of FIGS. 6, 7, and/or 8) as a logic low signal. (Block 1216).

In response, the ramp generator 624 determines whether to continue operating. (Block 1218). If the ramp generator 624 determines to continue operating (e.g., the control of block 1218 returns a result of YES), control returns to block 1202. Alternatively, if the ramp generator 624 determines not to continue operating (e.g., the control of block 1218 returns a result of NO), the process 1200 stops.

From the foregoing, it will be appreciated that example methods, apparatus and articles of manufacture have been disclosed that enable and/or otherwise facilitate multiple modes of operation in a converter (e.g., a power stage, a buck converter, a boost converter, etc.). The disclosed methods, apparatus and articles of manufacture improve the efficiency of using a computing device by utilizing a single integrated chip to operate a converter (e.g., a power stage, a buck converter, a boost converter, etc.) in either fixed frequency mode and/or constant-on-time mode. Furthermore, examples disclosed herein may utilize an auxiliary half-bridge network to be utilized in generating an example trigger signal during constant-on-time mode operation. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to facilitate multiple modes of converter operation are disclosed herein. Further examples and combinations thereof include the following:

Example 1 includes an apparatus comprising an amplifier including an input terminal and an output terminal, the input terminal configured to be coupled to an output terminal of a power converter, the output terminal configured to provide a control signal representative of a duty cycle associated with the power converter, a compensator including an input terminal and an output terminal, the input terminal of the compensator coupled to the output terminal of the amplifier and configured to receive the control signal, the compensator configured to generate a first signal for a fixed frequency mode of the power converter, a comparator including a first input terminal, a second input terminal, and an output terminal, the first input terminal of the comparator coupled to the output terminal of the amplifier and configured to receive the control signal, and the second input terminal of the comparator configured to be coupled to the output terminal of the power converter, the comparator configured to generate a second signal for a constant-on-time mode of the power converter, and a switch network configured to couple the output terminal of the compensator to a pulse width modulated signal generator based on a first state of a select signal, and to couple the output terminal of the comparator to the pulse width modulated signal generator based on a second state of the select signal.

Example 2 includes the apparatus of example 1, wherein the switch network includes a first output terminal and a second output terminal, wherein the first output terminal of the switch network is configured to be coupled to a first input terminal of the pulse width modulated signal generator, and wherein the second output terminal of the switch network is configured to be coupled to a second input terminal of the pulse width modulated signal generator.

Example 3 includes the apparatus of example 1, wherein the switch network further includes a third input terminal and a fourth input terminal, the apparatus further including a fixed voltage regulator configured to generate a third signal in the constant-on-time mode for the power converter, and an oscillator configured to generate a fourth signal in the fixed frequency mode for the power converter.

Example 4 includes the apparatus of example 3, wherein the third signal is a constant-on-time control signal, and wherein the fourth signal is a fixed frequency trigger signal.

Example 5 includes the apparatus of example 1, wherein the first signal is a fixed frequency control signal, and wherein the second signal is a constant-on-time trigger signal.

Example 6 includes the apparatus of example 1, wherein the switch network includes a select terminal configured to be coupled to a select controller, the switch network to obtain the select signal via the select terminal.

Example 7 includes an apparatus comprising a comparator configured to, based on a control voltage signal satisfying a threshold voltage level of an output voltage signal, provide a first trigger signal to initiate a first pulse width modulated signal in a constant-on-time mode for a power converter, an oscillator configured to provide a second trigger signal to initiate a second pulse width modulated signal in a fixed frequency mode for the power converter, and a selector configured to receive a select signal, the selector configured to output the first trigger signal to a pulse width modulated signal generator to initiate the first pulse width modulated signal based on a first state of the select signal, and output the second trigger signal to the pulse width modulated signal generator to initiate the second pulse width modulated signal based on a second state of the select signal.

Example 8 includes the apparatus of example 7, further including a voltage regulator to provide a first control signal to adjust a width of the first pulse width modulated signal in the constant-on-time mode for the power converter, and a compensator to provide a second control signal to adjust a width of the second pulse width modulated signal in the fixed frequency mode for the power converter.

Example 9 includes the apparatus of example 7, further including an amplifying network to provide the control voltage signal to the comparator.

Example 10 includes the apparatus of example 9, wherein the amplifying network includes a differential difference amplifier.

Example 11 includes the apparatus of example 7, wherein the output voltage signal is generated using at least one of a ramp generator, a direct inductor current sensor, an indirect inductor current sensor, or an emulated inductor current sensor.

Example 12 includes the apparatus of example 7, wherein the control voltage signal satisfies the threshold voltage level of the output voltage signal when the control voltage signal is greater than the output voltage signal.

Example 13 includes the apparatus of example 7, wherein the selector is configured to be coupled to a select controller, and wherein the select controller is to provide the select signal.

Example 14 includes the apparatus of example 7, wherein the second state is different than the first state.

Example 15 includes a system comprising a power stage including an input terminal, a pulse width modulated signal generator including a first input terminal, a second input terminal, and an output terminal coupled to the input terminal of the power stage, and a pulse width modulated signal controller including an input terminal coupled to a select controller to receive a select signal, a first output terminal coupled to the first input terminal of the pulse width modulated signal generator, and a second output terminal coupled to the second input terminal of the pulse width modulated signal generator, the pulse width modulated signal controller configured to output a first trigger signal to the pulse width modulated signal generator via the first output terminal, the first trigger signal to initiate first pulse width modulated signal in a constant-on-time mode for the power stage based on a first state of the select signal, and output a second trigger signal to the pulse width modulated signal generator via the second output terminal, the second trigger signal to initiate a second pulse width modulated signal in a fixed frequency mode for the power stage based on a second state of the select signal.

Example 16 includes the system of example 15, wherein the pulse width modulated signal controller is to output a first control signal to the pulse width modulated signal generator via the first output terminal, the first control signal to adjust a width of the first pulse width modulated signal in the constant-on-time mode for the power stage based on the first state of the select signal, and output a second control signal to the pulse width modulated signal generator via the second output terminal, the second control signal to adjust a width of the second pulse width modulated signal in the fixed frequency mode for the power stage based on the second state of the select signal.

Example 17 includes the system of example 15, wherein the second state is different than the first state.

Example 18 includes the system of example 15, further including a voltage divider coupled between an output terminal of the power stage and a second input terminal of the pulse width modulated signal controller.

Example 19 includes the system of example 15, wherein the pulse width modulated signal generator is an analog, ramp-based pulse width modulated signal generator.

Example 20 includes the system of example 15, wherein the pulse width modulated signal generator is a delay pulsed width modulated signal generator.

The following claims are hereby incorporated into this Detailed Description by this reference, with each claim standing on its own as a separate embodiment of the present disclosure.

What is claimed is:

1. An apparatus comprising:
    an amplifier including an input terminal and an output terminal, the input terminal configured to be coupled to an output terminal of a power converter, the output terminal configured to provide a control signal representative of a duty cycle associated with the power converter;
    a compensator including an input terminal and an output terminal, the input terminal of the compensator coupled to the output terminal of the amplifier and configured to receive the control signal, the compensator configured to generate a first signal for a fixed frequency mode of the power converter;
    a comparator including a first input terminal, a second input terminal, and an output terminal, the first input terminal of the comparator coupled to the output terminal of the amplifier and configured to receive the control signal, and the second input terminal of the comparator configured to be coupled to the output terminal of the power converter, the comparator configured to generate a second signal for a constant-on-time mode of the power converter; and
    a switch network configured to couple the output terminal of the compensator to a pulse width modulated signal generator based on a first state of a select signal, and to couple the output terminal of the comparator to the pulse width modulated signal generator based on a second state of the select signal.

2. The apparatus of claim 1, wherein the switch network includes a first output terminal and a second output terminal, wherein the first output terminal of the switch network is configured to be coupled to a first input terminal of the pulse width modulated signal generator, and wherein the second output terminal of the switch network is configured to be coupled to a second input terminal of the pulse width modulated signal generator.

3. The apparatus of claim 1, wherein the switch network further includes a third input terminal and a fourth input terminal, the apparatus further including:
    a fixed voltage regulator configured to generate a third signal in the constant-on-time mode for the power converter; and
    an oscillator configured to generate a fourth signal in the fixed frequency mode for the power converter.

4. The apparatus of claim 3, wherein the third signal is a constant-on-time control signal, and wherein the fourth signal is a fixed frequency trigger signal.

5. The apparatus of claim 1, wherein the first signal is a fixed frequency control signal, and wherein the second signal is a constant-on-time trigger signal.

6. The apparatus of claim 1, wherein the switch network includes a select terminal configured to be coupled to a select controller, the switch network to obtain the select signal via the select terminal.

7. An apparatus comprising:
    a comparator configured to, based on a control voltage signal satisfying a threshold voltage level of an output voltage signal, provide a first trigger signal to initiate a first pulse width modulated signal in a constant-on-time mode for a power converter;
    an oscillator configured to provide a second trigger signal to initiate a second pulse width modulated signal in a fixed frequency mode for the power converter; and
    a selector configured to receive a select signal, the selector configured to:
        output the first trigger signal to a pulse width modulated signal generator to initiate the first pulse width modulated signal in response to the select signal in a first state; and
        output the second trigger signal to the pulse width modulated signal generator to initiate the second pulse width modulated signal in response to the select signal in a second state that is different than the first state.

8. The apparatus of claim 7, further including:
    a voltage regulator to provide a first control signal to adjust a width of the first pulse width modulated signal in the constant-on-time mode for the power converter; and
    a compensator to provide a second control signal to adjust a width of the second pulse width modulated signal in the fixed frequency mode for the power converter.

9. The apparatus of claim 7, further including an amplifying network to provide the control voltage signal to the comparator.

10. The apparatus of claim 9, wherein the amplifying network includes a differential difference amplifier.

11. The apparatus of claim 7, wherein the output voltage signal is generated using at least one of a ramp generator, a direct inductor current sensor, an indirect inductor current sensor, or an emulated inductor current sensor.

12. The apparatus of claim 7, wherein the control voltage signal satisfies the threshold voltage level of the output voltage signal when the control voltage signal is greater than the output voltage signal.

13. The apparatus of claim 7, wherein the selector is configured to be coupled to a select controller, and wherein the select controller is to provide the select signal.

14. A system comprising:
    a power stage including an input terminal;
    a pulse width modulated signal generator including a first input terminal, a second input terminal, and an output terminal coupled to the input terminal of the power stage; and
    a pulse width modulated signal controller including an input terminal coupled to a select controller to receive a select signal, a first output terminal coupled to the first input terminal of the pulse width modulated signal generator, and a second output terminal coupled to the second input terminal of the pulse width modulated signal generator, the pulse width modulated signal controller configured to:
        output a first trigger signal to the pulse width modulated signal generator via the first output terminal, the first trigger signal to initiate a first pulse width modulated signal in a constant-on-time mode for the power stage based on a first state of the select signal; and output a second trigger signal to the pulse width modulated signal generator via the second output terminal, the second trigger signal to initiate a second pulse width modulated signal in a fixed frequency mode for the power stage based on a second state of the select signal.

15. The system of claim 14, wherein the pulse width modulated signal controller is to:

output a first control signal to the pulse width modulated signal generator via the first output terminal, the first control signal to adjust a width of the first pulse width modulated signal in the constant-on-time mode for the power stage based on the first state of the select signal; and output a second control signal to the pulse width modulated signal generator via the second output terminal, the second control signal to adjust a width of the second pulse width modulated signal in the fixed frequency mode for the power stage based on the second state of the select signal.

16. The system of claim 14, wherein the second state is different than the first state.

17. The system of claim 14, further including a voltage divider coupled between an output terminal of the power stage and a second input terminal of the pulse width modulated signal controller-.

18. The system of claim 14, wherein the pulse width modulated signal generator is an analog, ramp-based pulse width modulated signal generator.

19. The system of claim 14, wherein the pulse width modulated signal generator is a delay pulsed width modulated signal generator.

* * * * *